United States Patent [19]

Takayanagi

[11] Patent Number: 5,046,166
[45] Date of Patent: Sep. 3, 1991

[54] DIGITAL ELECTROPHOTOGRAPHIC COPYING APPARATUS

[75] Inventor: Hiroshi Takayanagi, Kanagawa, Japan

[73] Assignee: Fuji Xerox Co., Ltd., Tokyo, Japan

[21] Appl. No.: 595,619

[22] Filed: Oct. 10, 1990

[51] Int. Cl.$^5$ .......................... H04N 1/29; H04N 1/21
[52] U.S. Cl. .................................... 358/300; 358/444; 355/207; 355/285
[58] Field of Search ............... 358/296, 300, 404, 444; 355/204, 205, 206, 207, 208, 209, 282, 285, 286, 289

[56] References Cited

U.S. PATENT DOCUMENTS

| 4,318,612 | 3/1982 | Brannan | 355/289 |
| 4,415,800 | 11/1983 | Dodge | 355/206 |
| 4,551,007 | 11/1985 | Elter | 355/286 |

Primary Examiner—Benjamin R. Fuller
Assistant Examiner—Scott A. Rogers
Attorney, Agent, or Firm—Finnegan, Henderson, Farabow, Garrett, and Dunner

[57] ABSTRACT

A digital electrophotographic copying apparatus, comprising; document reading section having a start-up process for reading documents and producing corresponding image data, image storage section having a start-up process for temporarily storing the image data obtained from the document reading means, image printing section having a start-up process for printing document copies according to an electrophotographic process based on the image data stored in the image storage means, job control section for starting the document reading of the document reading means and the image storing of the image storage means upon switching electrical power to the digital electrophotographic copying apparatus and upon an indication of completion of the document reading section start-up process and the image storage section start-up process before receiving an indication of completion the image printing section process.

8 Claims, 21 Drawing Sheets

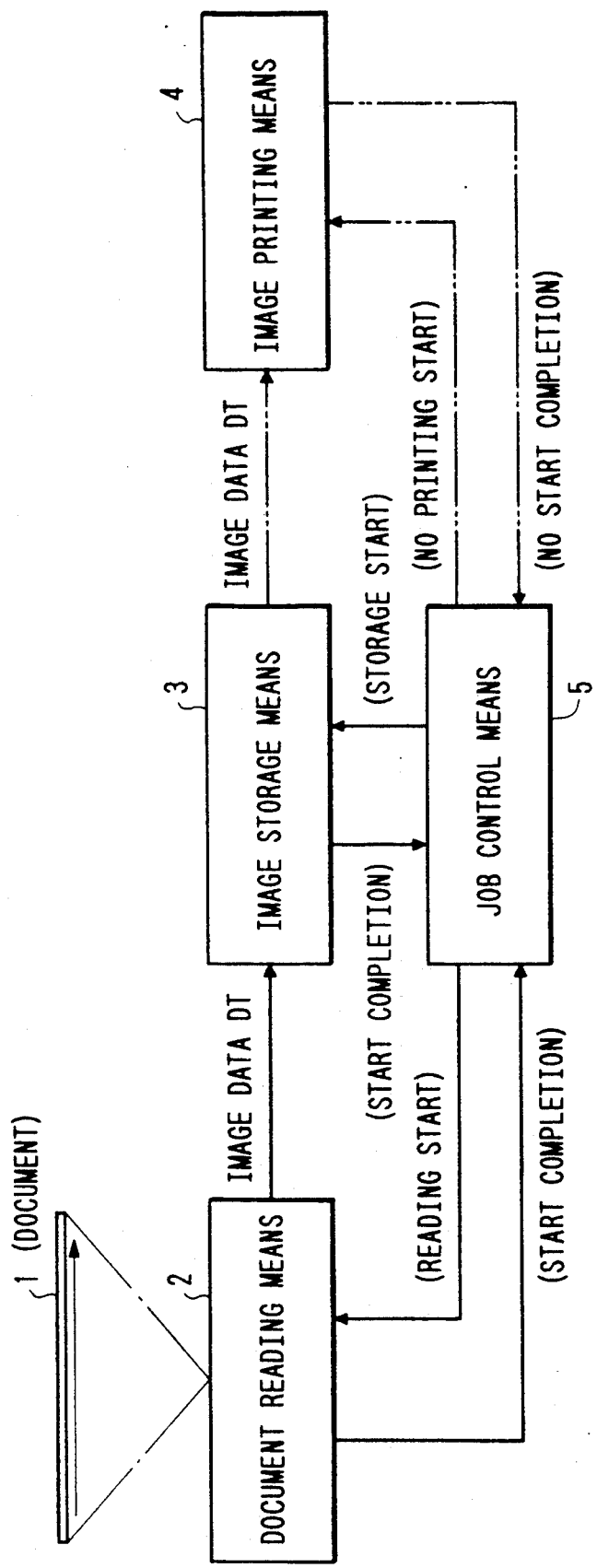

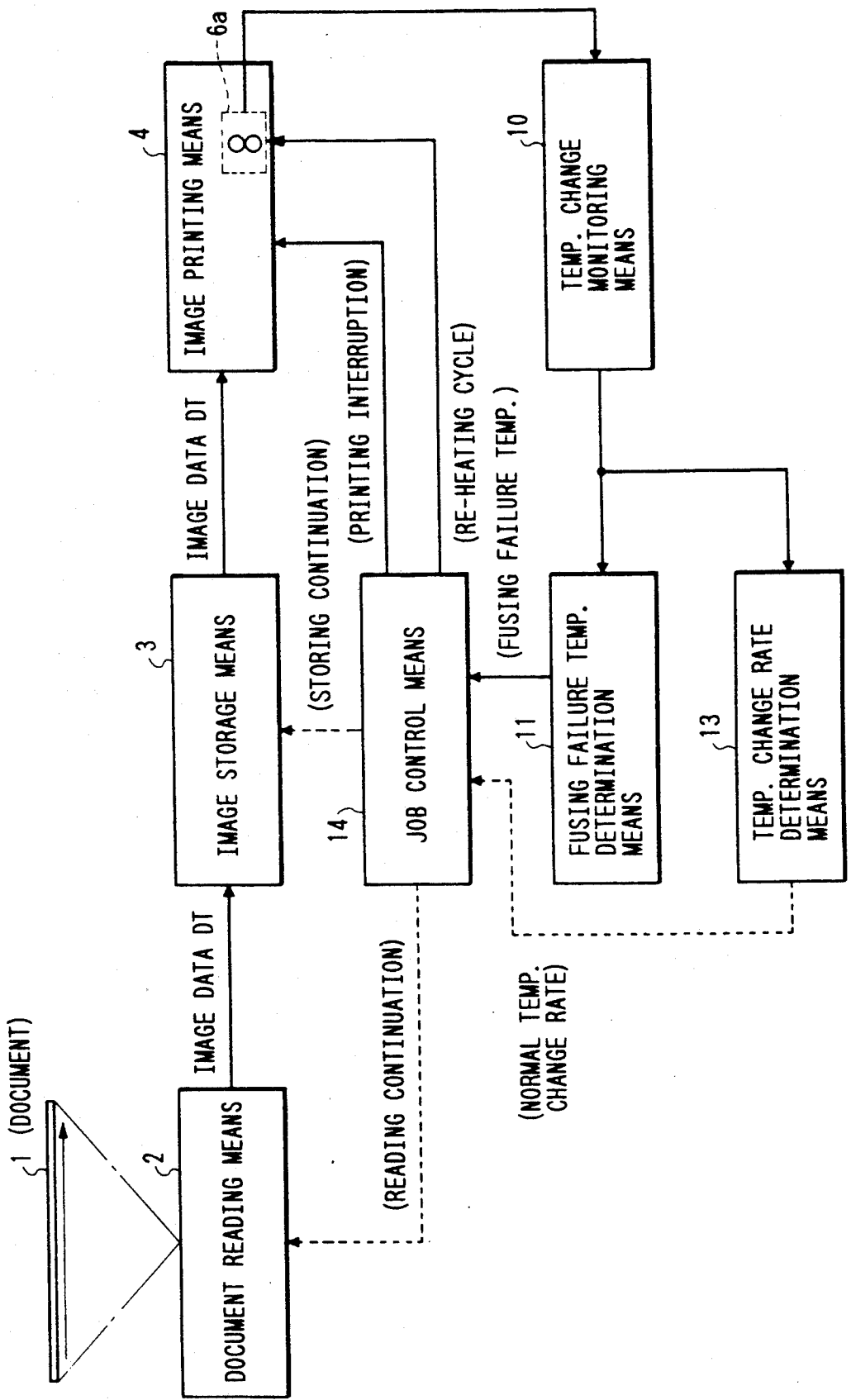

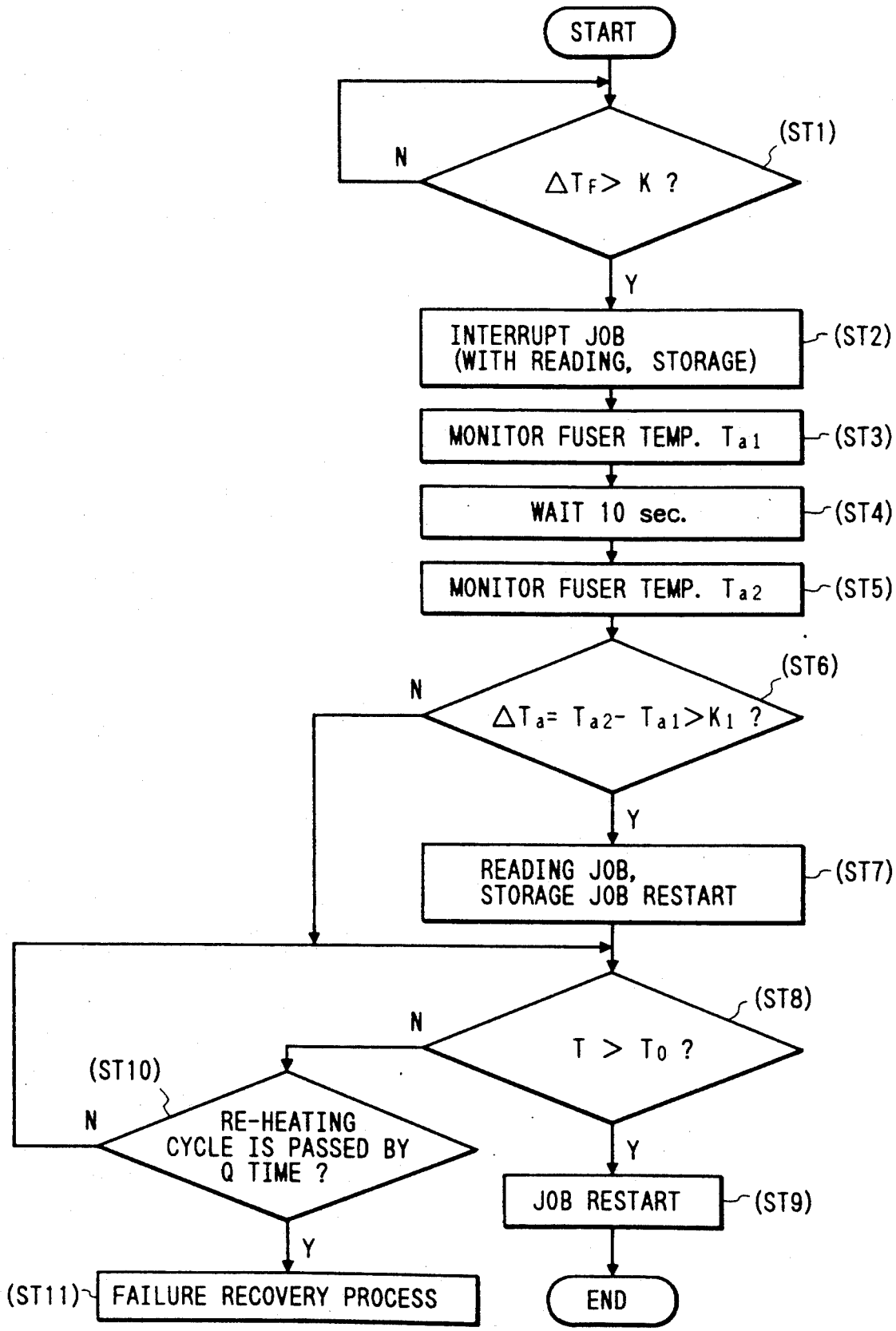

DIGITAL ELECTROPHOTOGRAPHIC COPYING APPARATUS

BACKGROUND OF THE INVENTION

1. Field of the Invention

The present invention relates to a digital electrophotographic copying apparatus and, particularly, relates to an image-storing, digital electrophotographic copying apparatus in which image data obtained by reading a document are stored before being printed.

2. Discussion of the Related Art

An image-storing, digital electrophotographic copying apparatus comprising a document reading means, an image storage means for temporarily storing image data obtained from the document reading means, and an image printing means for printing copies according to an electrophotographic process based on the image data stored in the image storage means is known in the art. This type of copying apparatus typically performs many functions which may include electronic recirculating document handling (RDH), reverse output processing, sample copying, etc.

A conventional image-storing digital electrophotographic copying apparatus generally starts a printing job only after the image printing means is ready for operation because copy printing is the final object of the electrophotographic copying apparatus. It is, therefore, typically impossible to operate the electrophotographic copying apparatus before completion of a image printing means start-up process. Furthermore, the time required for this start-up process, that is the time required for the image printing means to become ready for operation following application of electrical power to the electrophotographic copying apparatus, is usually longer than the time required for the document reading means and the image storage means to become ready for operation. As a result, the conventional electrophotographic copying apparatus requires an operator to wait for between 5 to 10 minutes before the entire electrophotographic copying apparatus becomes ready for operation.

Similarly, when the temperature of the fuser in the image printing means becomes lower than a fusing failure temperature it is necessary to interrupt the printing operation and reheat the fuser. When this so-called fusing failure occurs the conventional electrophotographic copying apparatus cannot be used until the fuser has reheated, and during the 3 to 7 minutes required for the fuser to reheat the operator cannot conduct substantive copying work.

It is also typically the case that the interruption of the printing job following a fusing failure is determined only on the basis of a comparison between the fuser temperature and the fusing failure temperature. Accordingly, when the temperature of the fuser reaches the fusing failure temperature just before the completion of a printing job, the job is kept waiting and the time required for completion of the job may be significantly and unnecessarily increased.

SUMMARY OF THE INVENTION

The present invention has been made in view of the above circumstances and has as an object to provide an image-storing digital electrophotographic copying apparatus which can begin the process of copying documents before the image printing means is completely ready for operation upon apparatus start-up.

A further object of the present invention is to provide a digital electrophotographic copying apparatus in which the waiting time during the fuser reheating cycle is minimized to improve the copying productivity of the apparatus.

Additionally, an object of the present invention is to eliminate the interruption of a printing job typically caused by the fuser reheating cycle to thereby minimize the time required to complete the job.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a digital electrophotographic copying apparatus comprises a document reading section having a start-up process for reading documents and producing corresponding image data, an image storage section having a start-up process for temporarily storing the image data obtained from the document reading means, an image printing section having a start-up process for printing document copies according to an electrophotographic process based on the image data stored in the image storage means, a job control section for starting the document reading of the document reading means and the image storing of the image storage means upon switching of electrical power to the digital electrophotographic copying apparatus and upon an indication of completion of the document reading section start-up process and the image storage section start-up process before receiving an indication of completion of a start-up process for the image printing means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings, FIGS. 1A to 1E are explanatory views showing a digital electrophotographic copying apparatus according to an embodiment of the present invention;

FIG. 12 is a flow chart showing a job control sequence at the time of printing;

DETAILED DESCRIPTION OF THE PREFERRED EMBODIMENTS

Figure 1B:
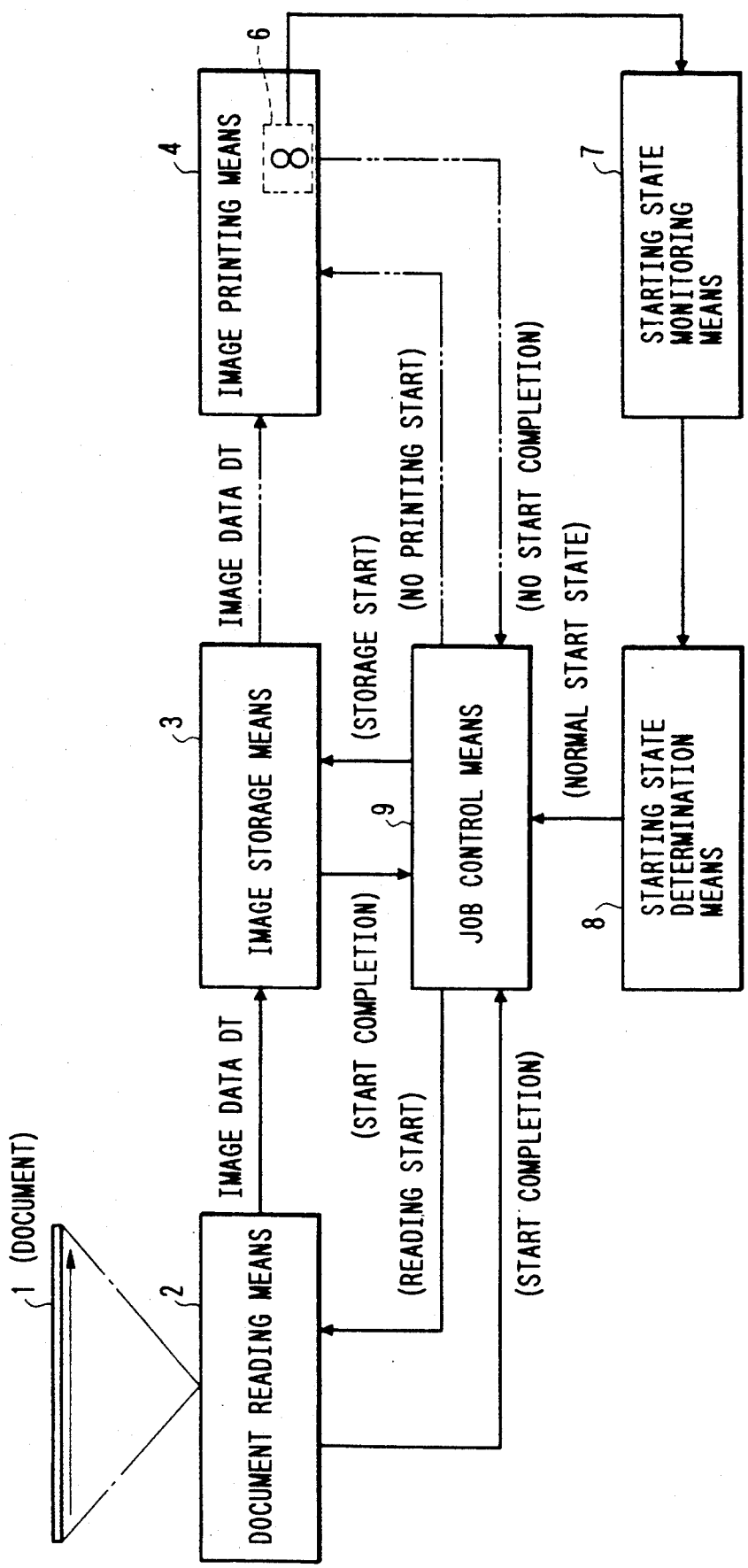

FIG. 1A shows a digital electrophotographic copying apparatus according to a first embodiment of the present invention comprising a document reading means 2 for reading documents 1, an image storage means 3 for temporarily storing image data obtained from the document reading means 2, and an image printing means 4 for printing document copies according to an electrophotographic process based on the image data stored in the image storage 3 means, and a job control means 5 for starting the document reading operation of the document reading means 2 and image storing operation of the image storage means 3.

Job control means 5 will start the document reading operation and document storing operation upon completion of the start-up process for the document reading means 2 and image storing means 3 and before completion of the start-up process for the image printing means 4.

FIG. 1B shows a digital electrophotographic copying apparatus according to a second embodiment of the present invention comprising a document reading means 2 for reading documents 1, an image storage means 3 for temporarily storing image data obtained from the document reading means 2, and an image printing means 4 for printing document copies according to an electrophotographic process based on the image data stored in the image storage means 3, a starting state monitoring means 7 for monitoring, upon start-up of the apparatus, the state of a sub-unit 6 of the image printing means 4, a starting state determination means 8 for predictively determining, based on information obtained from the starting state monitoring means 7, whether or not the sub-unit 6 will start within a predetermined range of operating norms, and a job control means 9 for starting a document reading operation by the document reading means 2 and an image storing operation by the image storage means 3 when the starting state determination means 8 determines that the sub-unit 6 will start within the range of operating norms.

In the second embodiment of the digital electrophotographic copying apparatus, the starting state monitoring means 7 is arranged to monitor a temperature change of a fuser which is the sub-unit 6, and the starting state determination means 8 is arranged to predictively determine on the basis of a temperature rising rate of the fuser, whether or not the fuser will start within a predetermined range of operating norms. The second embodiment avoids an unnecessary document reading operation and image storing operation when a failure occurs in the image printing means.

Figure 1C:
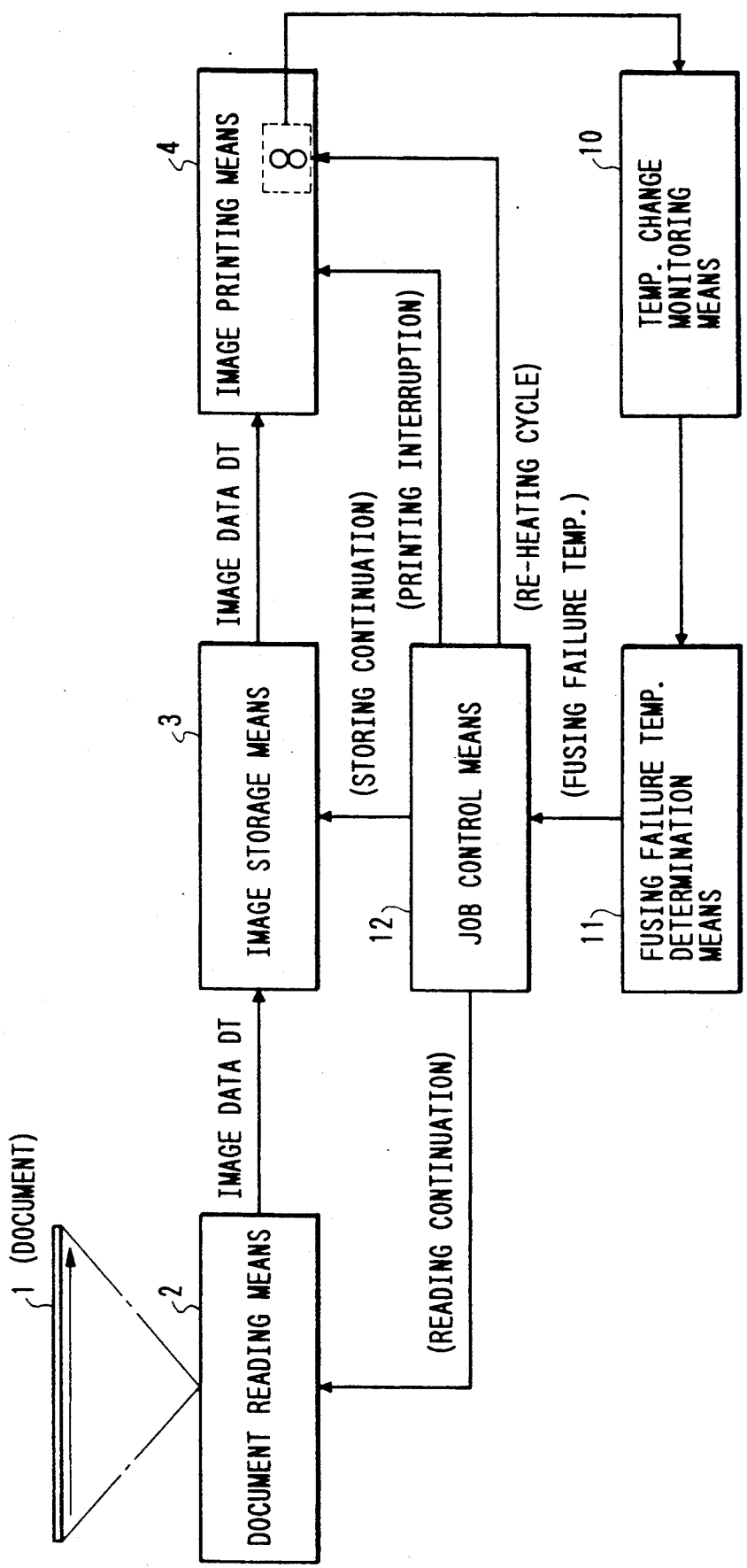

FIG. 1C shows a digital electrophotographic copying apparatus according to a third embodiment of the present invention comprising a document reading means 2 for reading documents 1, an image storage means 3 for temporarily storing image data obtained from the document reading means 2, and an image printing means 4 for printing document copies according to an electrophotographic process based on the image data stored in the image storage means 3, a temperature change monitoring means 10 for monitoring the temperature change of a fuser during the printing operation of image printing means 4, a fusing failure temperature determination means 11 for determining, based on information obtained from the temperature change monitoring means 10, whether or not the temperature of the fuser falls below a predetermined fusing failure temperature, and a job control means 12 for temporarily interrupting the printing operation of the image printing means 4 to execute a fuser reheating cycle while continuing both the document reading operation of the document reading means 2 and the image storing operation of the image storage means 3 when the fusing failure temperature determination means 11 determines that the temperature of the fuser has fallen below the fusing failure temperature.

FIG. 1D, shows a digital electrophotographic copying apparatus according to a fourth embodiment of the present invention comprising a document reading means 2 for reading documents 1, an image storage means 3 for temporarily storing image data obtained from the document reading means 2, and an image printing means 4 for printing document copies according to an electrophotographic process based on the image data stored in the image storage means 3, a temperature change monitoring means 10 for monitoring a temperature change of a fuser during the printing operation of the image printing means 4, a fusing failure temperature determination means 11 for determining, based on information obtained from the temperature change monitoring means 10, whether or not the temperature of the fuser has fallen below a predetermined fusing failure temperature, a temperature change rate determination means 13 for determining, based on information obtained from the temperature change monitoring means 10, whether or not the rate of fuser temperature change is within a predetermined range of norms, and a job control means 14 for temporarily interrupting the printing operation of the image printing means 4 to execute a fuser reheating cycle when the fusing failure temperature determination means 11 determines that the temperature of the fuser has fallen below the fusing failure temperature while continuing both document reading operation of the document reading means 2 and image storing operation of the image storage means 3 under the condition that the temperature change rate determination means 13 has determined decision that the rate of temperature change of the fuser is within the predetermined range of operating norms. The temperature change rate determination means 13 may be means for determining whether or not the rate of temperature rising or temperature falling is within the predetermined range of operating norms.

Figure 1E:
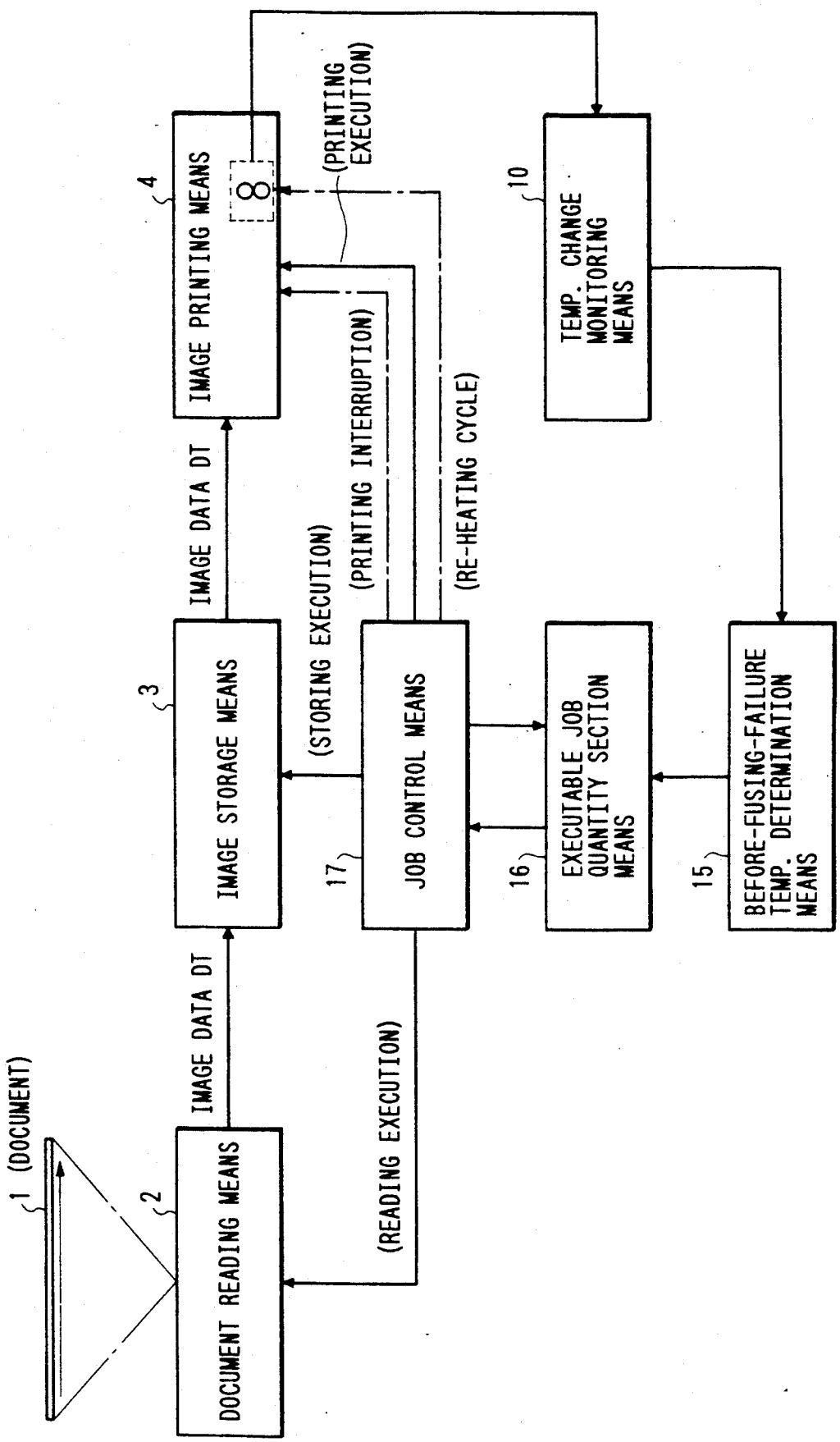

FIG. 1E shows a digital electrophotographic copying apparatus according to a fifth embodiment of the present invention comprising a document reading means 2 for reading documents 1, an image storage means 3 for temporarily storing image data obtained from the document reading means 2, and an image printing means 4 for printing document copies according to an electrophotographic process based on the image data stored in the image storage means 3, a temperature change monitoring means 10 for monitoring a temperature change of a fuser during the printing operation of the image printing means 4, a before-fusing-failure temperature determination means 15 for determining, based on information obtained from the temperature change monitoring means 10, whether or not the temperature of the fuser falls below a before-fusing-failure temperature which is near the fusing failure temperature, an executable job quantity selection means 16 for selecting the quantity of each job executable in a period between the before-fusing-failure temperature and the fusing failure temperature based on comparison between information concerning the number of copies printable in the period between the before-fusing-failure temperature and the fusing failure temperature and information concerning the number of copies in a current job and other jobs stored in the image storage means 3, when the before-fusing-failure temperature determination means 15 determines that the temperature of the fuser has fallen below the before-fusing-failure temperature, and a job control means 17 for temporarily interrupting the printing operation of the image printing means 4 after completing a printing operation of a job selected by the executable job quantity selection means 16 and, at the same time, executing a fuser reheating cycle.

In the fifth embodiment of the digital electrophotographic copying apparatus it is necessary to take various sheet sizes into consideration, and, therefore, for example, a correction factor is preset for every sheet size. Accordingly, the information concerning the number of copies is determined on the basis of the corrector factor for every sheet size.

The several embodiments of the present invention will be described in further detail with reference to the accompanying drawings and according to the following outline:

I. Outline of the Apparatus
II. Constituent Parts of the Apparatus
  (1) Image Input Equipment
  (2) Image Storage
  (3) Image Printer
  (4) User Interface
  (5) Controller
III. Fuser Temperature Control
  (1) Fuser Construction
  (2) Fuser Temperature Control Circuit
  (3) Fuser Temperature Control Sequence
IV. Job Control
  (1) Job Control at
  (2) Job Control at the Time of Printing
V. Modifications

I. Outline of the Apparatus

Figure 2:
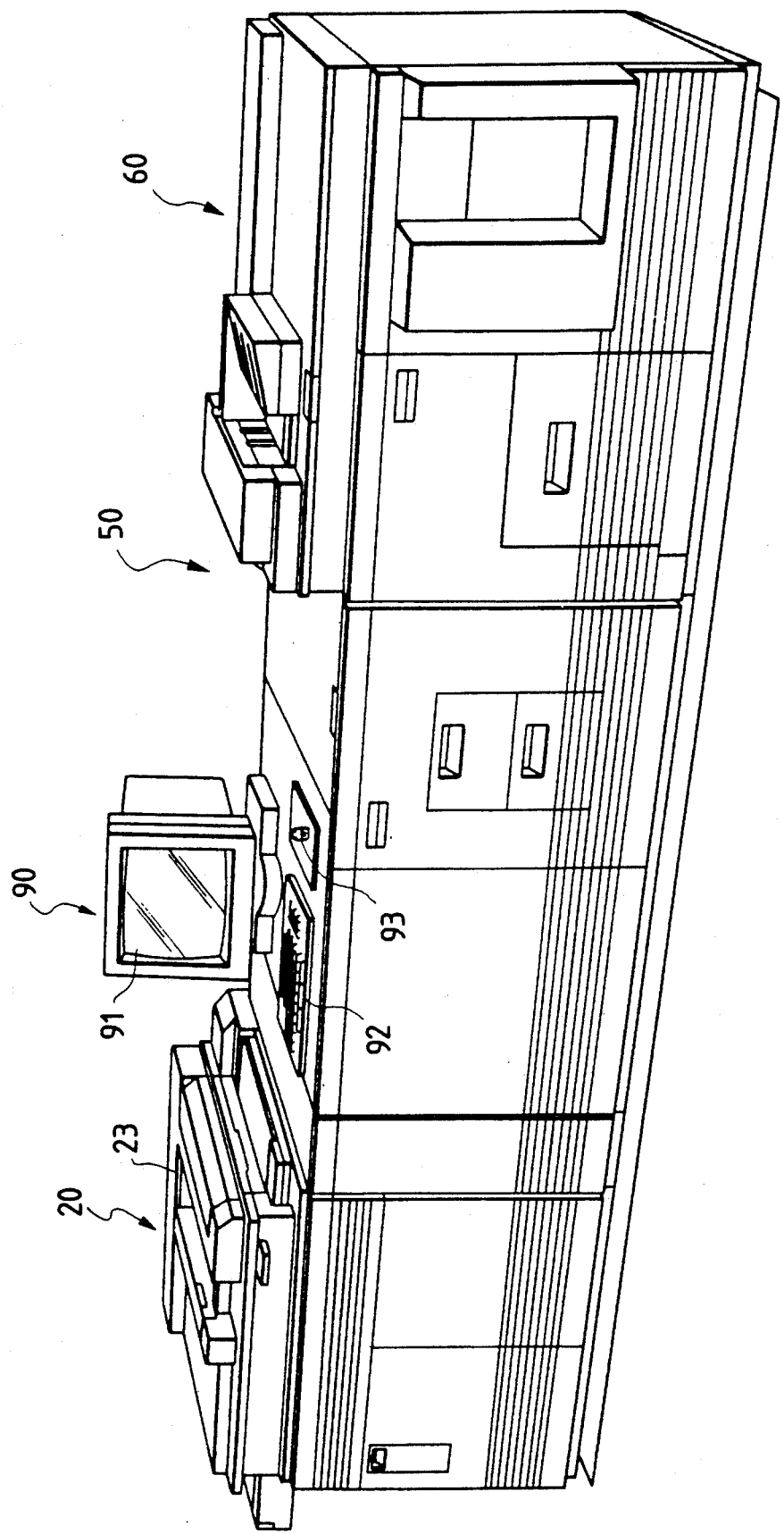
FIG. 2 is a perspective view showing the external appearance of an embodiment of the digital electrophotographic copying apparatus of the present invention.

FIG. 2 is a perspective view showing the exterior of a digital electrophotographic copying apparatus according to the present invention. The apparatus has an image input device 20 for reading a document as digital image data, an image storage device 50 for storing the image data obtained from the image input device 20, an image printing device 60 for printing copies according to an electrophotographic process based on the image data stored in the image storage device 50, a user interface 90 for designating the contents of a copying job and for checking the contents of document copies, and a controller (not shown) for correlatively controlling the image input device 20, the image storage device 50 and the image printing device 60 in accordance with the instructions supplied through the user interface 90.

In this embodiment, all images are once stored in the image storage device 50. Accordingly, a plurality of copies can be obtained from one document by a single scanning operation of the document in the image input device 20. A plurality of copies can be obtained from a set of documents by a single scanning operation of the set of documents in the image input device 20, because all the documents are read and successively stored as image data in the image storage device 50 and then successively read from the image storage and printed.

II. Constituent Parts of the Apparatus (1) Image Input Device

Figure 3:
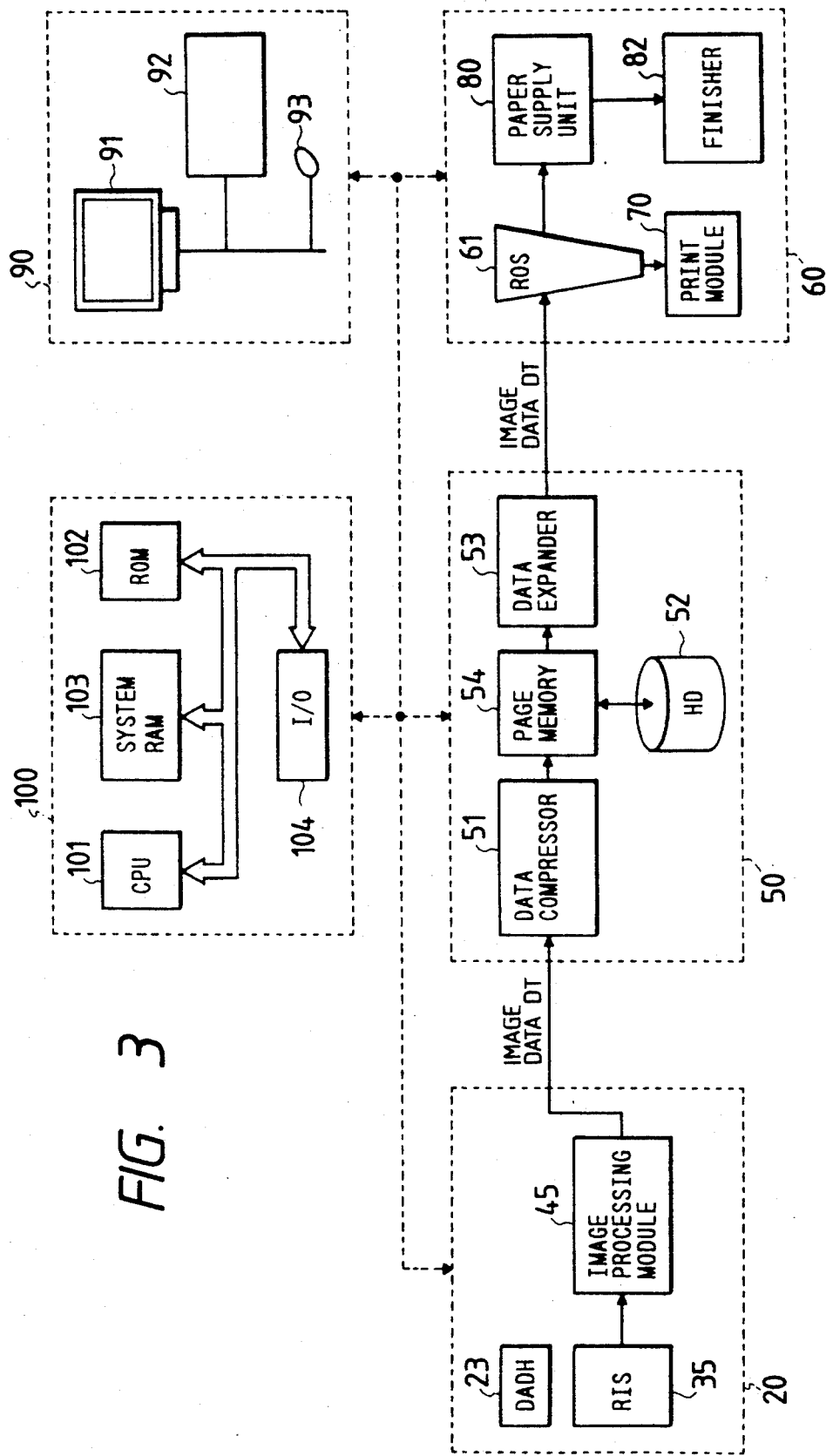
FIG. 3 is a block diagram of the digital electrophotographic copying apparatus.
Figure 4:
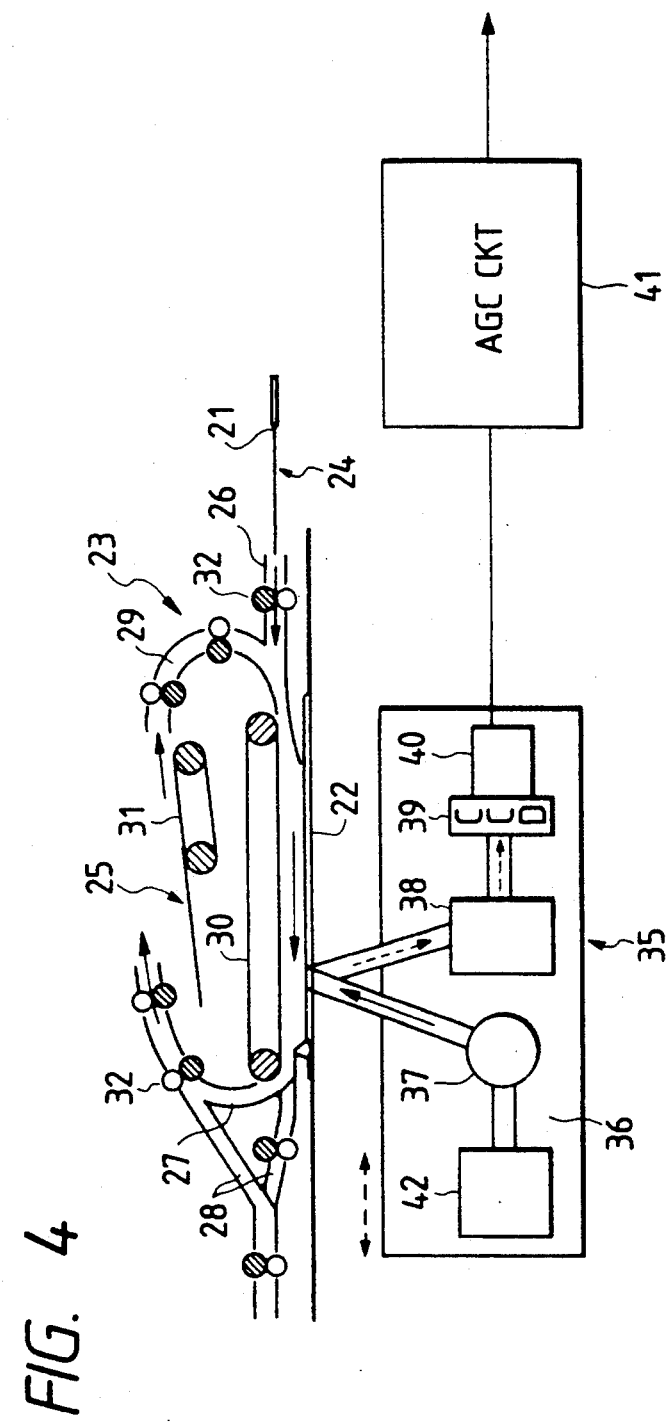
FIG. 4 is an explanatory view showing the details of a DADH and RIS of the present inventon.

As shown in FIGS. 3 and 4, the present invention has a duplex automatic document handler (hereinafter called "DADH") 23 for successively and automatically feeding documents 21 onto a platen 22, a raster input scanner (hereinafter called "RIS") 35 for reading the documents 21 on the platen 22, and an image processing module 45 for carrying out various processes, such as, shading correction, ghost correction, ground reveal removal, etc., and various editing processes, such as, scale-up and scale-down, italic type, half-tone dot meshing type, white-painted type, shadow type, etc., upon image data DT from the RIS 35.

As shown in FIG. 4, the DADH 23 comprises a document supply path 26 for feeding a document 21 from a document set position 24 toward platen 22, a document feedback path 27 for feeding back document 21 from platen 22 toward a document reception position 25, a document inversion feedback path 28 for feeding back document 21 from platen 22 to the document reception position 25 after inverting the document 21, a document re-supply path 29 for feeding the document 21 from document reception position 25 toward the platen 22 again, a document transport 30 for transporting document 21 from document supply path 26 and document re-supply path 29 onto the platen 22, and feed rolls 31 and feed belts 32 suitably arranged in the respective document feed paths 26 to 29. When a single-sided document 21 is supplied, document feed paths 26 and 27 are used. When a document-sided document is supplied, document feed paths 26 and 28 are first used and then document feed paths 29 and 27 are used.

The RIS 35 has a scanning fluorescent lamp 37 mounted onto a scanning carriage 36 moving along one side of platen 22, so that light from the moving fluorescent lamp 37 is radiated onto document 21 on platen 22, and then reflected to an image sensor which in this embodiment is a charge coupled device (CCD) 39 through an optical system 38. The image data read by the image sensor 39 are sent to an automatic gain control circuit 41 through a sensor interface 40 and then fed into the image processing module 45 after suitable gain control. Reference numeral 42 designates a lamp heater used for temperature control of the fluorescent lamp 37.

(2) Image Storage

In FIG. 3, the image storage device 50 comprises a data compressor 51 for compressing image data DT from the image processing module 45 according to a conventional compression algorithm, a hard disk device 52 for storing the image data DT compressed by the data compressor 51 as an image data file, a data expander 53 for expanding the compressed image data DT stored in the hard disk device 52 according to a conventional expansion algorithm, and a page memory 54 serving as a buffer for temporarily storing one or more pages of image data DT when the image data DT from the data compressor 51 are stored in the hard disk device 52 or when the image data DT from the hard disk device 52 are transferred to the data expander 53.

Information concerning the attributes of the image data file, as well as the image data file, is stored on the hard disk device 52. Alternatively, the attribute information may be stored in a memory independent of the hard disk device 52 after the image data file and the attribute information have been related to each other. The information concerning the attributes of the image data file contains, for example, the number of pages, the resolving power in each page, the image data structure such as the number of tones, color or monochrome, the page size, number of effective bits in the fast scanning direction (main scanning direction) or slow scanning direction (auxiliary scanning-direction), the presence or absence of photographic mode designation, the date of reading, etc.

The image data file stored in the hard disk device 52 is printed out based on the attribute information by the image printing device 60 according to processes designated by the user interface 90, such as the electronic RDH, scale-up or scale-down to designated magnification, the number of copies, double-sided/single-sided, stapling, tape binding, etc. When the image data file has been printed out the image data file as well as the attribute information are erased.

(3) Image Printer

In FIG. 3, the image printer 60 comprises a raster output scanner (hereinafter called "ROS") 61 for generating an optical image based on the image data DT from the data expander 53, a printing module 70 for forming a latent image corresponding to the optical image generated by the ROS 61 and for making the latent image visible on printing paper, a paper supply unit 80 for supplying recording paper to the printing module 70 in synchronism with the writing timing of the ROS 61, and a finisher 82 for carrying out suitable after-printing processes, such as, stapling, tape binding, etc., upon a bundled set of printing paper when the printing operation of the printing mode 70 is finished.

Figure 5:
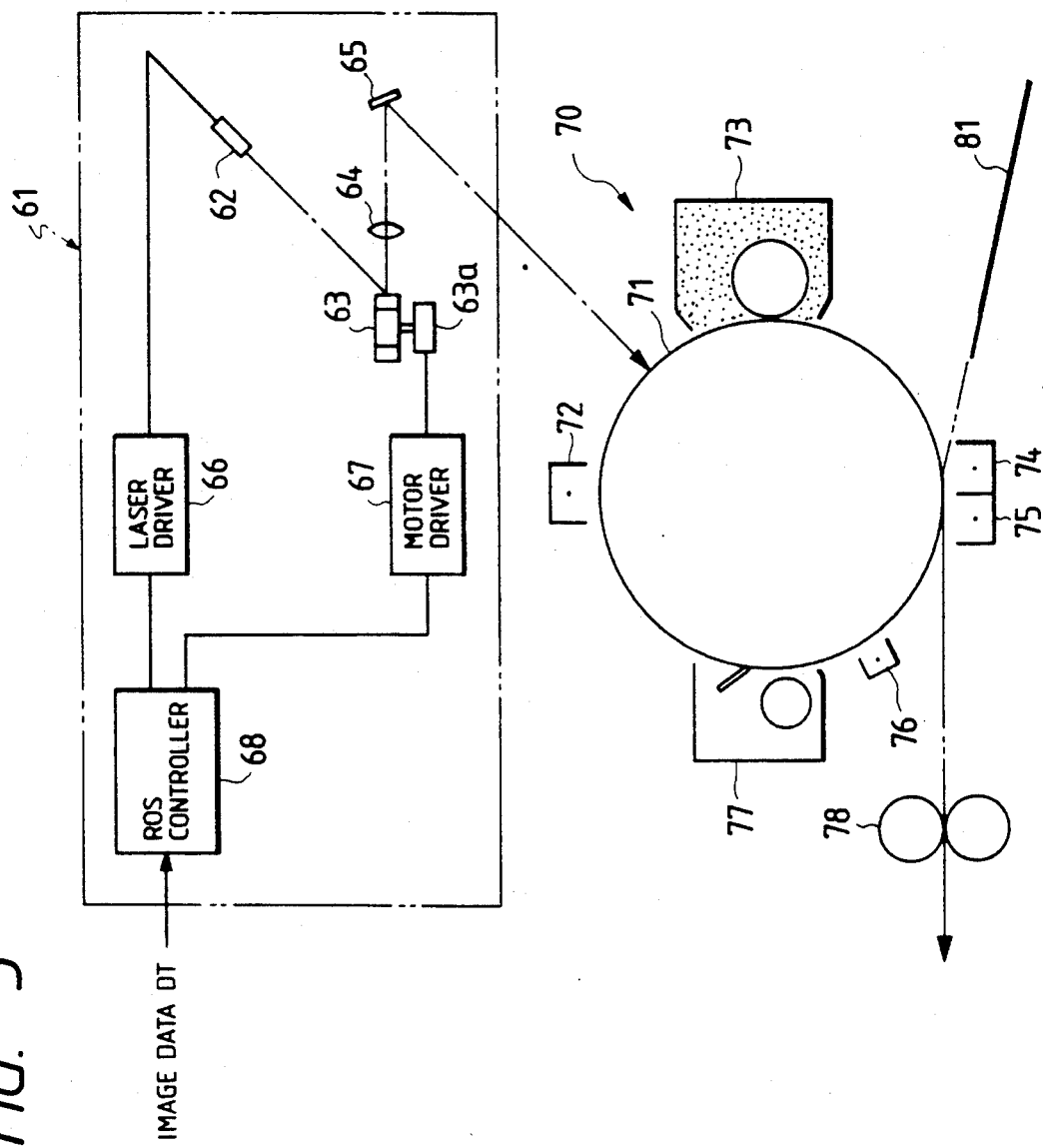
FIG. 5 is an explanatory view showing the details of a ROS and printing module of the present invention.

The ROS 61 and the printing module 70 are constituted as shown in FIG. 5. A semiconductor laser 62 emits a scanning beam and a polygonal mirror 63 reflects the beam from the semiconductor laser 63 in a predetermined scanning range. An imaging lens 64 converges the beams deflected by the polygon mirror 63 to form an image along a scanning line on a photosensitive drum 71 which will be described later. A reflection mirror 65 directs the beams to the scanning line position on the photosensitive drum 71. A laser driver 66 drives the semiconductor laser 62 and a motor driver 67 drives a drive motor 63a of the polygonal mirror 63. An ROS controller 68 provides a predetermined control signals to the laser driver 66 and the motor driver 67 based on the image data DT from the image storage 50.

Further, a photosensitive drum 71 having a photoconductive photoreceptor layer formed on its outside is electrified by corotron 72. A developer 73 performs toner development on latent images (negative latent images in which the electric potential of the image portion is lower than that of the background portion or positive latent image in which the electric potential of the image portion is higher than that of the background portion) written on the photosensitive drum 71 by the ROS 61. A transfer corotron 74 electrifies printing paper 81 from the paper supply unit 80 to transfer the toner image on the photosensitive drum 71 to the printing paper 81. A separation corotron 75 separates the printing paper 81 from the photosensitive drum 71 when the transfer process is finished. An electricity removing corotron 76 removes electric charges remaining on the photosensitive drum 71, and a cleaner 77 removes toner remaining on the photosensitive drum 71. A thermal-fixing-type fuser 78 heats and fixes the toner images transferred to the printing paper 81.

(4) User Interface

The user interface 90 shown in FIGS. 2 and 3, has a CRT display 91 for displaying job programs, a control board 92 for indicating job programs, and a mouse 93 for indicating a designated position on the CRT display 91.

(5) Controller

In FIG. 3, the controller 100 comprises a CPU 101 for generally controlling the image input device 20, the image storage device 50 and the image printing device 60 according to the instructions from the user interface 90. A ROM 102 stores various programs conducted by the CPU 101, a system RAM 103 stores rewritable data for the purpose of data exchange with respect to the CPU 101, and an I/O interface 104 connects the CPU 101 to an external apparatus. Starting programs for starting respective device, job progression programs for executing jobs in respective devices, failure control programs for controlling failures in respective devices, etc., are stored in the ROM 102.

III. Fuser Temperature Control (1) Fuser Construction

Figure 6:
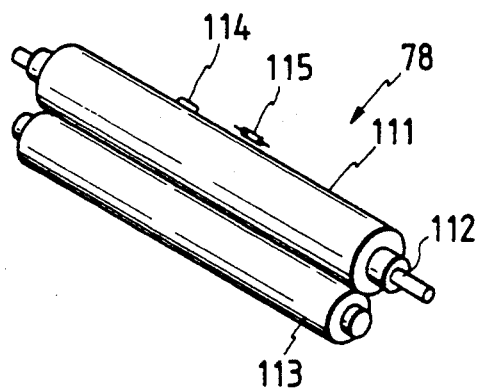
FIG. 6 is a perspective view showing the external appearance of a fuser.

As shown in FIG. 6, the fuser 78 has a heat roll 111 including a heating quartz lamp 112, and a pressure roll 113 rotating while being in forced contact with the heat roll 111. Accordingly, printing paper 81 bearing an unfused toner image is passed between the rolls 111 and 113. A thermosensor 114, which in this embodiment is a thermistor, is brought into contact with the heat roll 111 to detect the surface temperature of the heat roll 111, and a fuse 115 switches off a power supply circuit for the quartz lamp 112 if the heat roll 111 becomes overheated.

(2) Fuser Temperature Control Circuit

Figure 7:
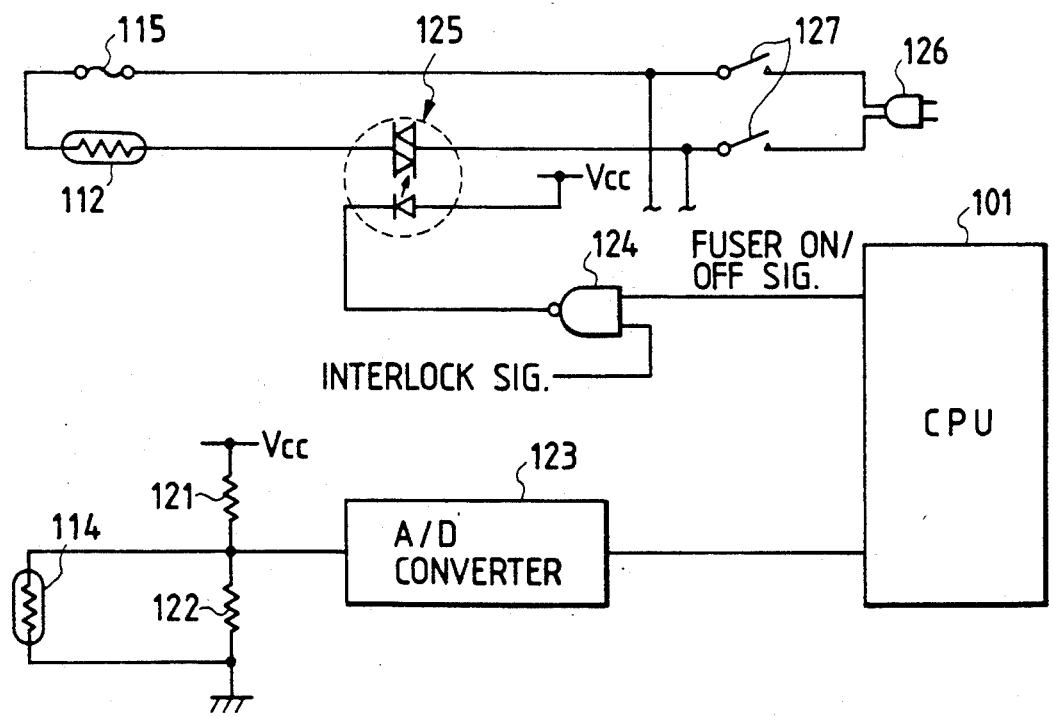
FIG. 7 is an explanatory view showing a fuser temperature control circuit.

An example of the construction of a fuser temperature control circuit used in this embodiment is shown in FIG. 7. A change of resistance through thermosensor 114 is detected as a change in a voltage proportionally distributed across resistors 121 and 122. The change of voltage is inputted to CPU 101 through an A/D converter 123. A fuser ON/OFF signal is outputted from CPU 101 and corresponds to the temperature information obtained from the thermosensor 114. The fuser ON/OFF signal, as well as an interlock signal, is inputted into NAND gate 124. A photo-triac 125 is controlled by the output signal of NAND gate 124 to provide a drive signal when its level is low, such that the ON/OFF control of the quartz lamp 112 is accomplished. An electric source socket 126 and a start switch 127 are as provided as is a source voltage cc.

(3) Fuser Temperature Control Sequence

Figure 8:
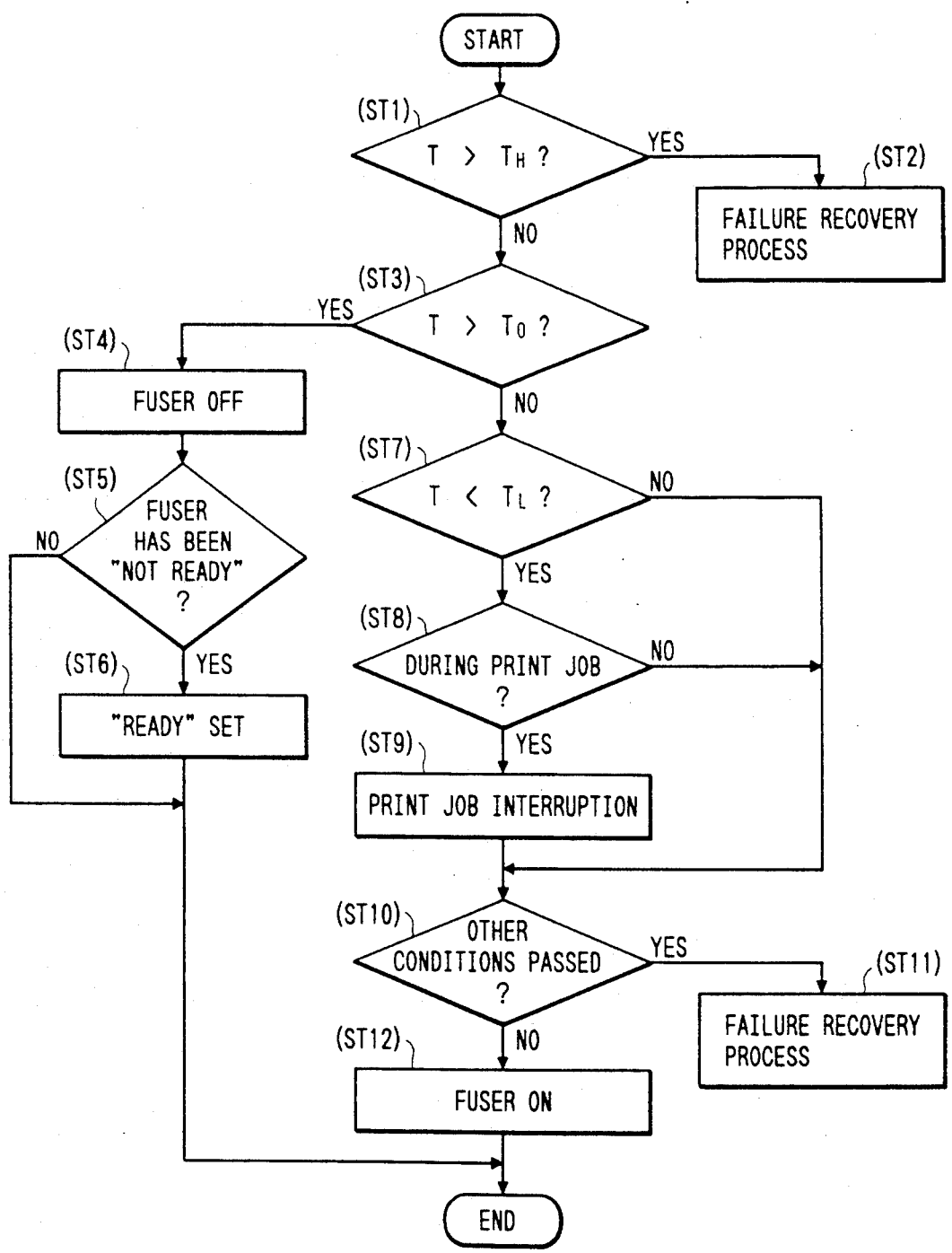
FIG. 8 is a flow chart showing the sequence of fuser temperature control.

The sequence of fuser temperature control is shown in FIG. 8. CPU 101 first determines whether or not the surface temperature T of the heat roll is greater than a predetermined overheat temperature $T_H$. $T_H$ is equivalent to the temperature at which the fuse 115 will burn out. (Step [hereinafter abbreviated to "ST"] 1.) If T is greater than $T_H$, a failure recovery process is carried out (ST2). However, if T is not greater than $T_H$, the sequence ST3.

In ST3, the CPU determines whether or not T is greater than a target control temperature $T_0$. If T is greater than $T_0$ the electrical power to the quartz lamp 112 is switched OFF to switch off the fuser (ST4). A determination is then made as to whether or not the fuser has been "NOT READY" (ST5). In the case where the fuser has been "NOT READY", "READY" is set (ST6) and the fuser temperature control sequence is terminated.

If in ST3, $T < T_0$ the sequence performs ST7 in which a determination is made as to whether or not $T < T_L$ where $T_L$ is the fusing failure temperature. A determination is then made as to whether or not a printing job is present (ST8). If the printing job is present, the printing job is interrupted (ST9).

A determination is made as to whether other conditions, such as, a paper jam, open interlock, broken down sub-unit, etc., are present (ST10). If other conditions are present, a failure recovery process is performed (ST11). If other conditions are not present, the fuser is switched ON (ST12) by applying power to the quartz lamp 112. The fuser temperature control sequence then is terminated.

Figure 9:
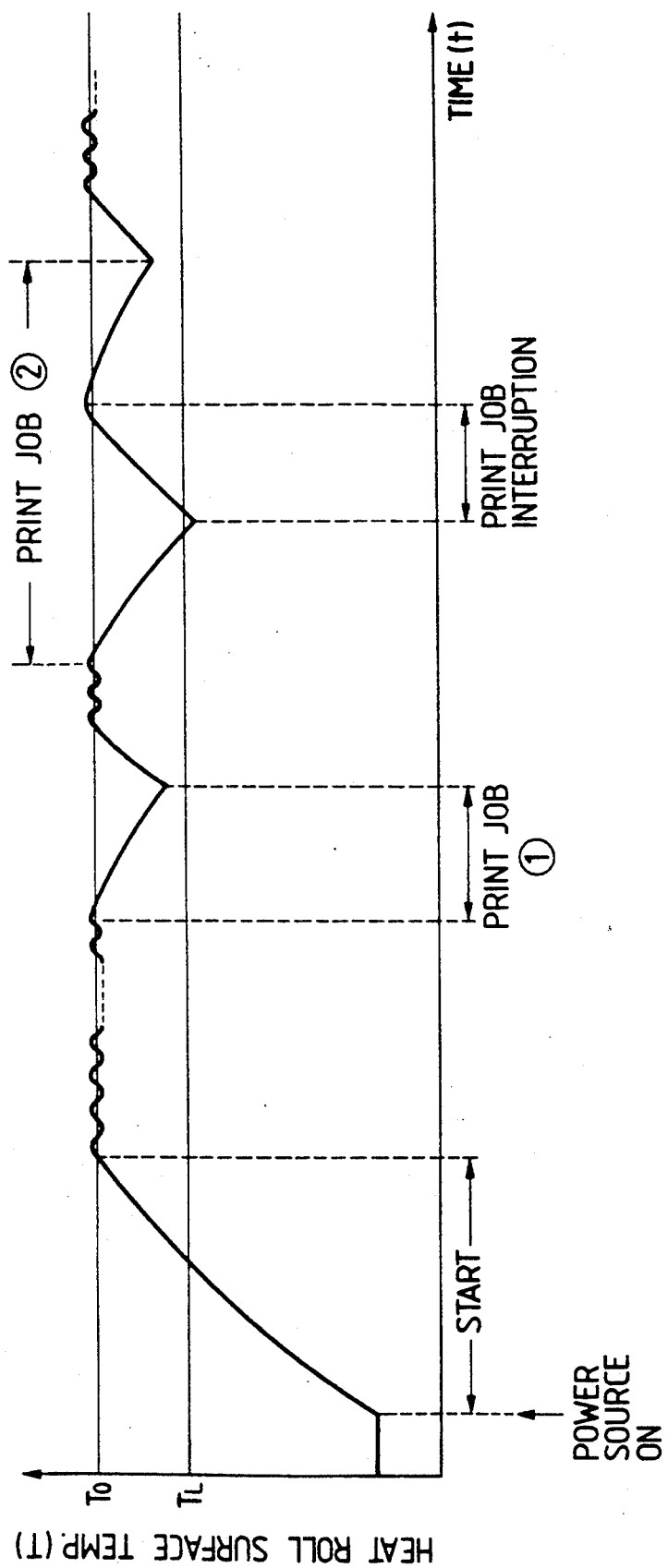
FIG. 9 is a graph showing the temperature change of the fuser as a function of time relative to printing operations.

According to the aforementioned fuser temperature control sequence, when electric power is turned ON to start the fuser, as shown in FIG. 9, the fuser is turned ON and the heat roll temperature T gradually rises until T is greater than $T_L$. If T exceeds the target control temperature $T_0$, the fuser is turned OFF. If, however, the heat roll temperature T is less than the target control temperature $T_0$, the fuser is turned ON. Accordingly, the heat roll temperature T converges to the target control temperature $T_0$ while repeatedly overshooting and undershooting the target control temperature.

The printing job 1 shown in FIG. 9 is assumed to comprise a relatively small number of copies. During job 1 the heat roll temperature T gradually falls as the job progresses. However, the heat roll temperature T does not reach the fusing failure temperature $T_L$. Following completion of job 1 the heat roll temperature T gradually rises to the target control temperature $T_0$ because the fuser remains continuously turned ON.

Printing job 2 shown in FIG. 9 is assumed to have a relatively large number of copies. During job 2 the heat roll temperature T gradually falls to the fusing failure temperature as the job progresses. At this point, job 2 is interrupted and the heat roll temperature T gradually rises. When the heat roll temperature T returns to the target control temperature $T_0$, the fuser is again set in "READY" and printing job 2 is restarted.

IV. Job Control (1) Job Control at the Time of the Starting of the Apparatus

Figure 10A:
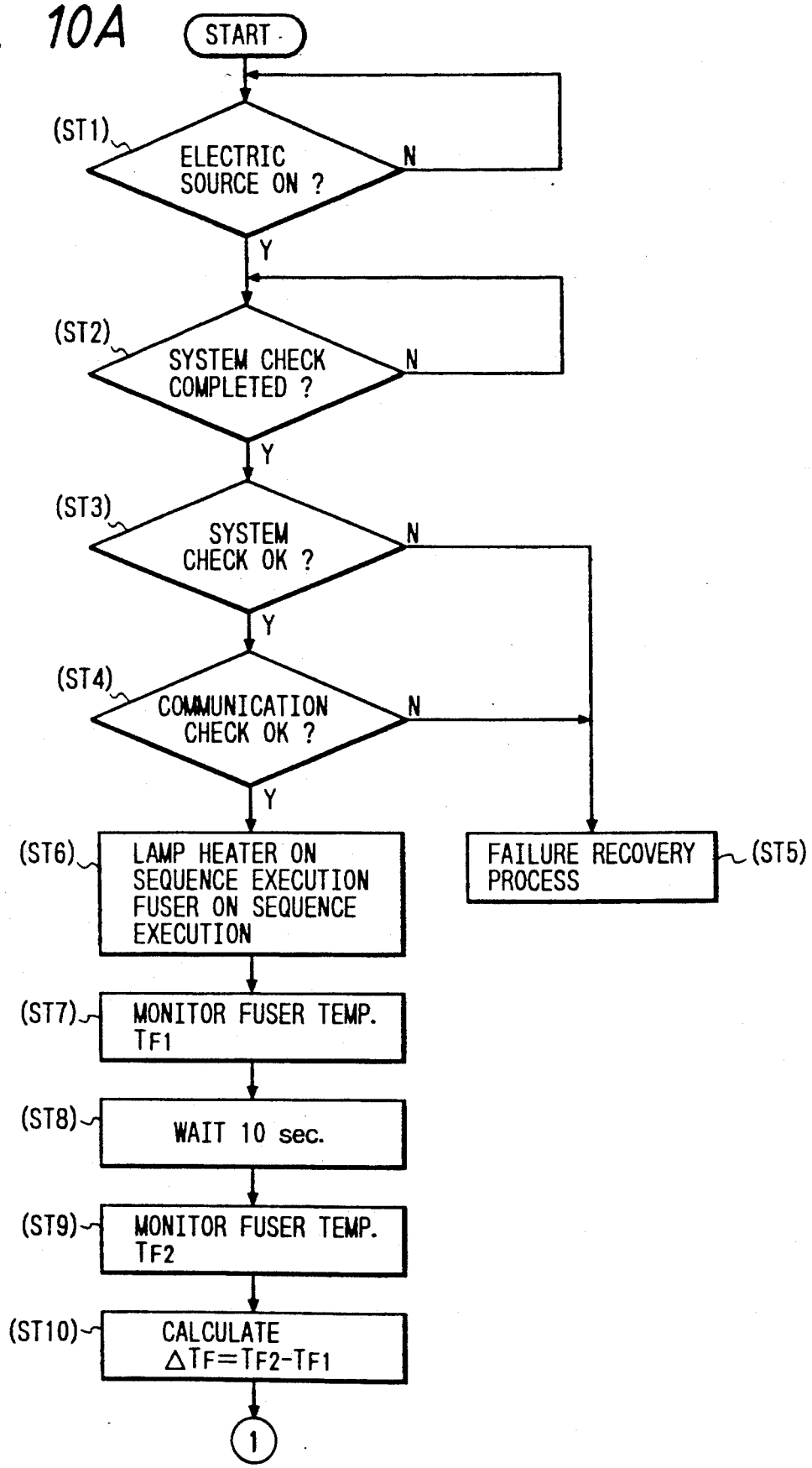
FIGS. 10A and 10B are flow charts showing the sequence of job control from the starting time of the apparatus of the present invention.

The job control sequence at the time of the starting of the apparatus is shown in FIG. 10A. If the electric source is turned ON (ST1), the CPU 101 conducts a system check with respect to the image input device 20, the image storage device 50, and the image printing device 60 to determine whether the job is ready to proceed (ST2, ST3). When the system check is OK, the sequence performs ST4 in which a communication check between respective devices is carried out (ST4). If either the system check or the communication check is not OK, failure recovery processing is carried out (ST5).

When a decision in ST4 is made that the communication check is OK, both the lamp heater ON sequence, which preheats the fluorescent lamp 37 and the fuser ON sequence, which preheats the fuser 78, are executed (ST6). The preheating cycle of the fluorescent lamp 37 is typically about 2 to 3 minutes, and the preheating cycle of the fuser 78 is typically 5 to 10 minutes.

Figure 11:
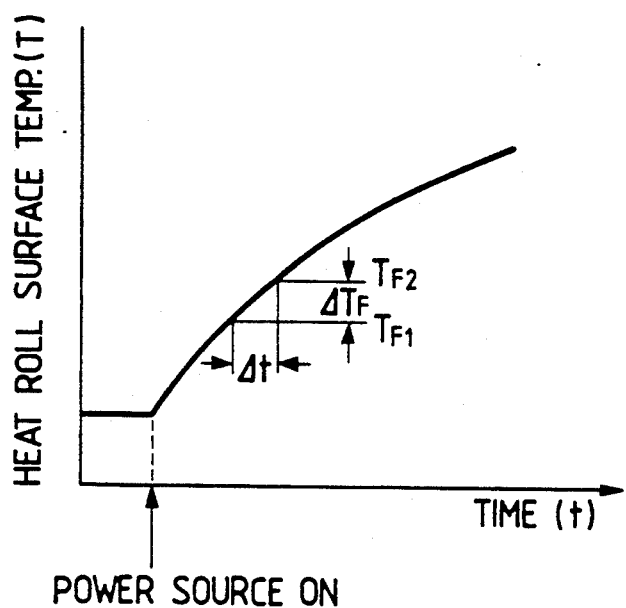
FIG. 11 is a graph illustrating the theory of a predictive decision made as to the normal starting state of the fuser.

While the lamp heater ON sequence is being executed, the CPU 101, monitors the fuser heat roll temperature, as shown in FIG. 11 (ST7). The initail monitor reading of the fuser heat roll temperature is designed as $T_{F1}$. Following a predetermined time, about 10 seconds in this embodiment, a second reading $T_{F2}$ is made (ST8, 9). Finally, the temperature rising rate $\Delta T_F = T_{F2} - T_{F1}$ is calculated from the monitored temperature readings (ST10).

Figure 10B:
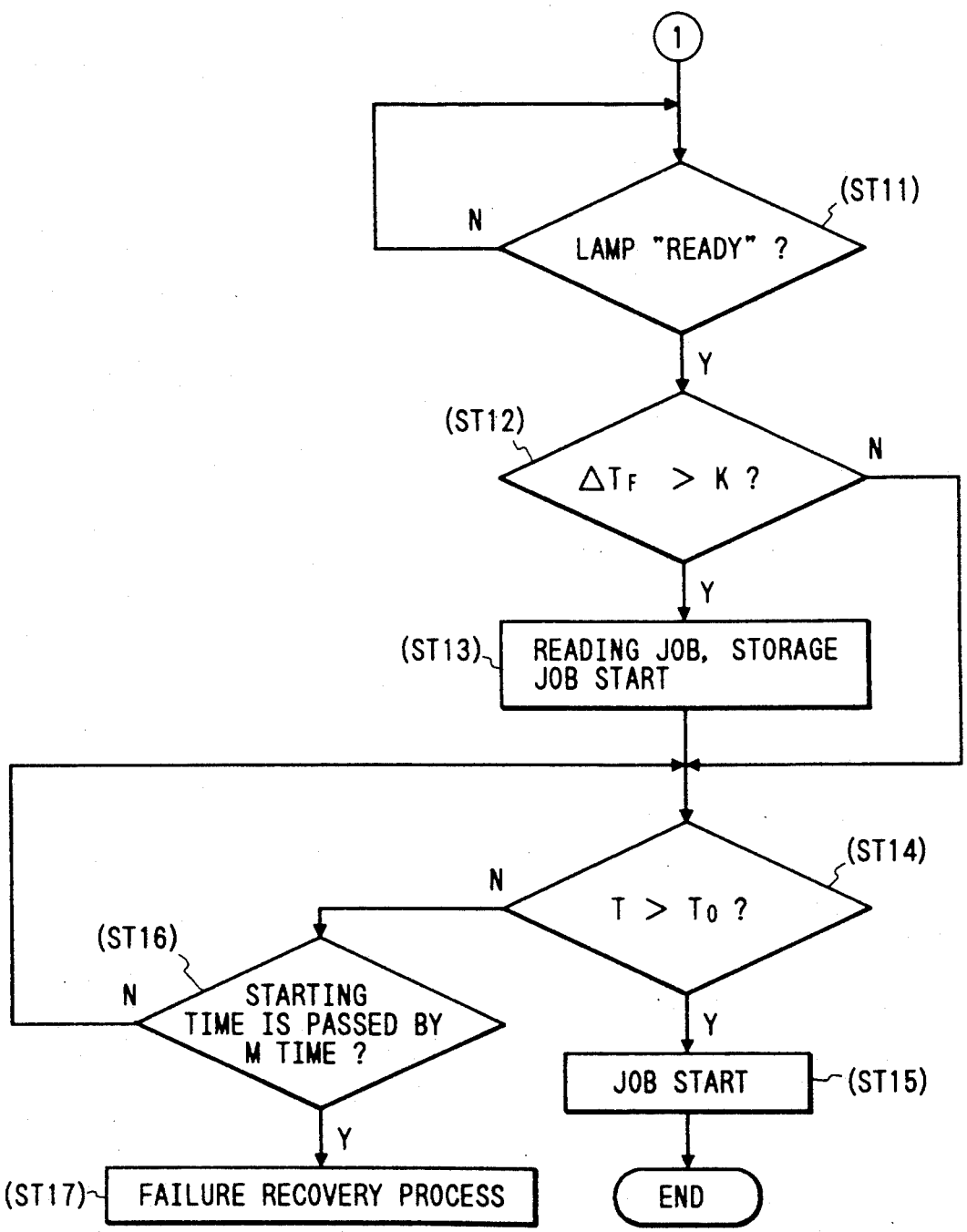

As shown continued in FIG. 10B, a determination is made as to whether the fluorescent lamp has been "READY" (ST11). After the "READY" state of the fluorescent lamp 37 is confirmed, a determination is made as to whether the temperature rising rate $\Delta T_F$ of the fuser is over a predetermined value k (ST12). If the temperature rising rate $\Delta T_F$ of the fuser is over the predetermined value k, a predictive decision is made that the starting state of the fuser 78 is within a predetermined range of operating norms (hereinafter "normal") because the most frequent causes of fuser breaking-down are breaking of the quartz lamp 112 and a failure in the photo-triac 125. Accordingly, both the document reading operation and the image storing operation are started prior to completion of image printing device start-up process (ST13). When a decision in ST12 is made that the rate is not more than the predetermined value k, the sequence performs ST14.

In ST14, a determination is made as to whether the fuser temperature T is greater than the target control temperature $T_0$. If the fuser temperature T is greater than the target control temperature $T_0$, the job (which designates a printing job in the case where both the document reading job and the image storage job have been already started) is started (ST15). On the other hand, if the fuser temperature T is less than the target control temperature $T_0$, a determination is made as to whether the starting time is beyond a predetermined time M (ST16). With the passage of the predetermined time M, failure recovery processing is carried out (ST17).

Figure 14:
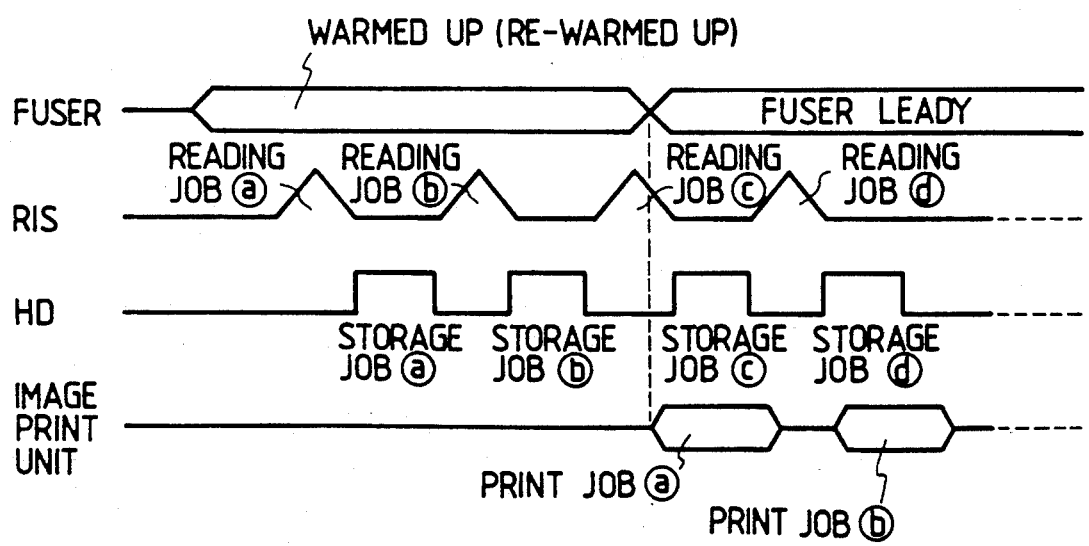
FIG. 14 is a timing chart showing an example of operation in a job control sequence.

According to the aforementioned job control sequence and as shown in FIG. 14, at the time of the starting the electrophotographic copying apparatus, under the condition that the fuser is predicted to be started normally, both the document reading job (a, b and a part of c) of the RIS 35 and the image storing job (a and b) of the hard disk device 52 are started prior to the completion of image printing device start-up process, i.e., the period required for fuser warm-up. When fuser warm-up is completed and the fuser is READY, the printing job (a, b . . . ) is started.

If, however, the fuser is predicted to not start normally the printing job cannot be carried out and the document reading operation and the image storing operation are not performed.

(2) Job Control at the Time of Printing

The job control sequence at the time of printing is shown in FIG. 12. The CPU 101 first determines whether the fuser temperature T is less than the fusing failure temperature $T_L$ (ST1). If the fuser temperature T is less than the fusing failure temperature $T_L$, the CPU 101 interrupts the document reading operation of the image input device 20, the image storing operation of the image storage 50, and the printing operation of the image printer 60 (ST2).

Thereafter, as shown in FIG. 12, the CPU 101 monitors the fuser temperature T. (ST3) The CPU determines an initial reading, $T_{a1}$. Following a predetermined waiting period, about 10 seconds in this embodiment, a second reading $T_{a2}$ is made. (ST4, ST5) The temperature rising rate $\Delta T_a$ is calculated from the two temperatures to determine whether the temperature rising rate $\Delta T_a$ is greater than a predetermined value $K_L$ (ST6).

When a determination in ST6 is made that $\Delta T_a$ is greater than the predetermined value $K_L$, the reheating cycle of the fuser 78 is estimated to be normal so that both the document reading operation and the image storing operation are restarted prior to the printing operation (ST7). When a determination in ST6 is made that $\Delta T_a$ is not greater than the predetermined value $K_L$, the sequence performs ST8.

In the ST8, a determination is made as to whether or not the fuser temperature T is greater than the target control temperature $T_0$ (ST8). If the temperature T is greater than the target control temperature $T_0$, which indicates the presences of a printing job in the case where both the document job and the image storing job have been already started, the job is restarted (ST9). On the other hand, if the fuser temperature T is not greater than the target control temperature $T_0$, a determination is made as to whether or not the reheating cycle has taken longer than a predetermined Q (ST10). If the elapsed time is greater than the predetermined time period Q, a failure recovery process is performed (ST11).

According to the aforementioned job control sequence at the time of printing, as shown in FIG. 14, under the condition that the fuser is predicted to be normal both the document reading job (a, b and a part of c) and the image storing job (a and b) are started prior to the printing job, in the period of the re-warming of the fuser. At the point of time when the re-warming of the fuser is completed and the fuser READY, the printing job (a, b . . . ) is started.

Accordingly, in the case where the fuser is estimated to not be normal and the printing job cannot be carried out, both the document reading operation and the image storing operation are not performed.

V. Modifications

Although the aforementioned first embodiment has illustrated the case where the document reading operation and the image storing operation are carried out under the condition of normal fuser operation at the time of the starting and at the time of printing, the invention can be applied to the case where steps ST7 to ST10 and ST12 in FIGS. 10A and 10B are omitted or steps ST2 to ST6 in FIG. 12 are omitted for the purpose of simplifying the job control sequence. This modification to the above described sequences may be desirable because situations where the fuser cannot operate normally will be relatively rare.

The basic construction of the digital electrophotographic copying apparatus as related to the second embodiment is substantially similar to that of first embodiment. The job control sequence at the time of printing is, however, different.

Figure 15:
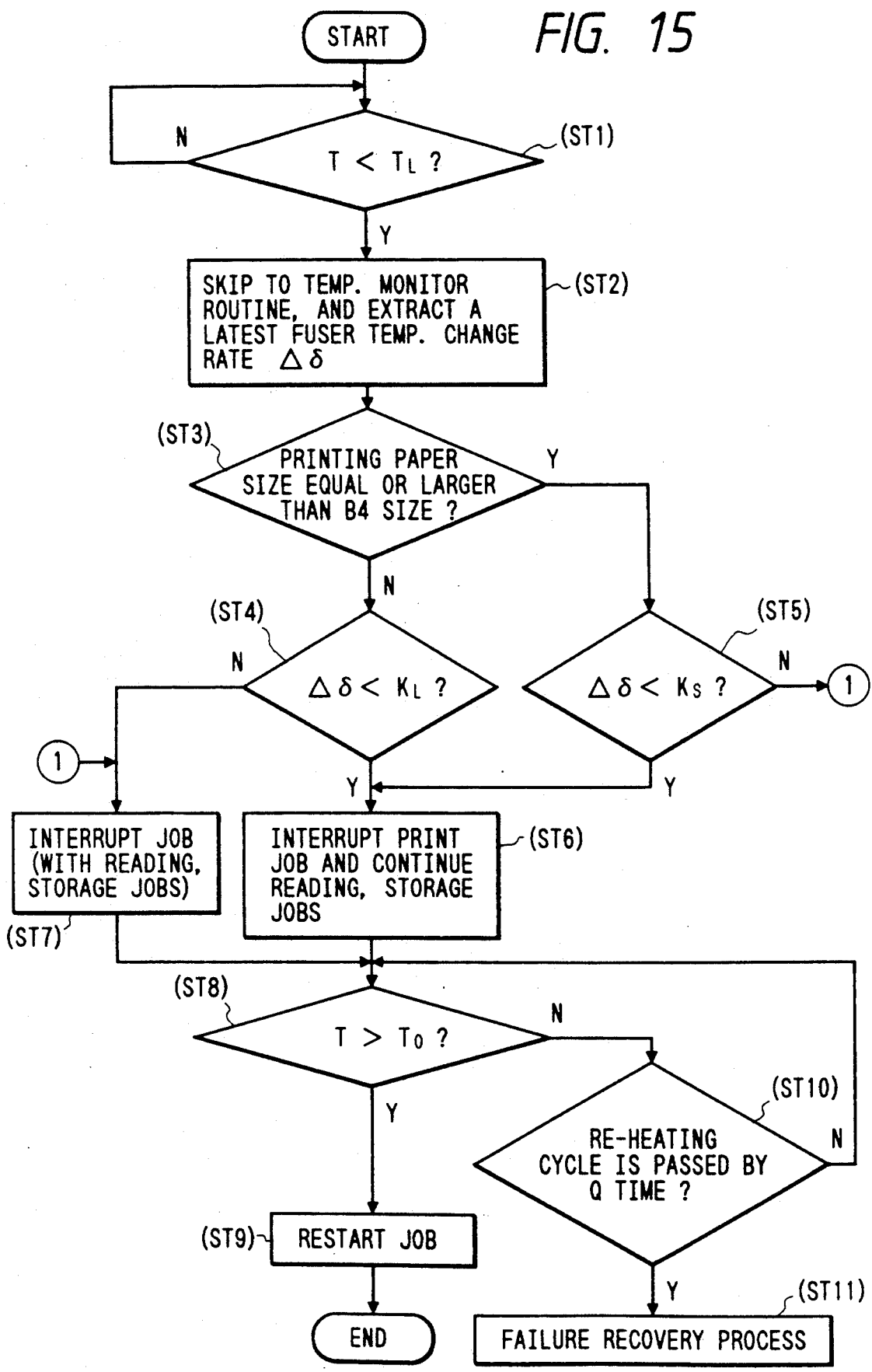
FIG. 15 is a flow chart showing the job control sequence at the time of printing of a digital electrophotographic copying apparatus according to a second embodiment of the present invention.

The job control sequence at the time of printing for the second embodiment is shown in FIG. 15. The CPU 101 first determines whether the fuser temperature T is less than the fusing failure temperature $T_L$ (ST1). When it is determined that the fuser temperature T is less than the fusing failure temperature $T_L$, the sequence skip to a temperature monitoring routine in which a current fuser temperature change rate $\Delta\delta$ is obtained (ST2).

Figure 17:
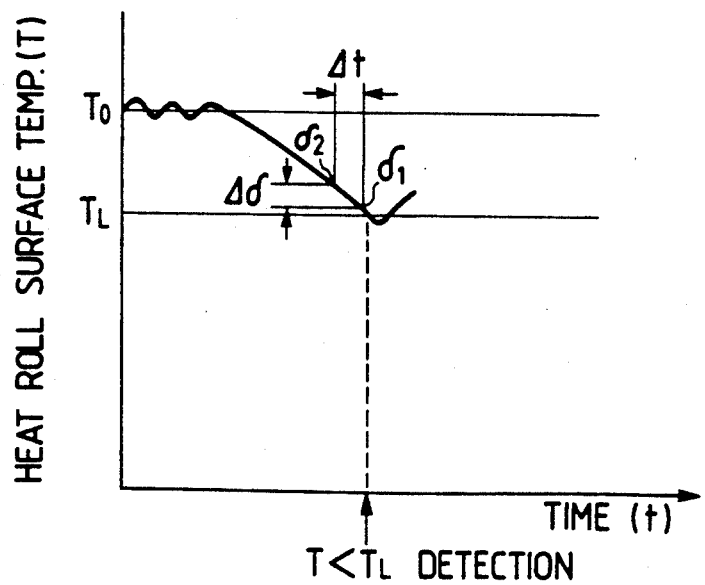
FIG. 17 is a graph illustrating the theory of a predictive decision made that the fuser is normal at the time of the reheating of the fuser.
Figure 13:
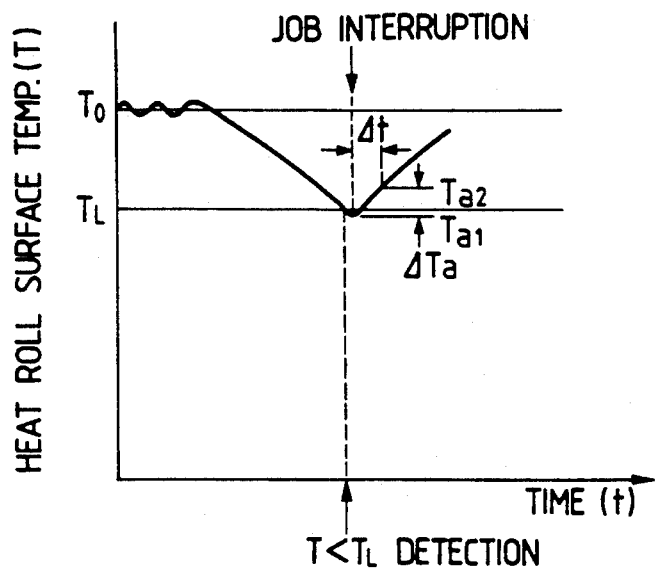
FIG. 13 is a graph illustrating the theory of a predictive decision made that the fuser is normal at the time of the reheating the fuser.
Figure 16:
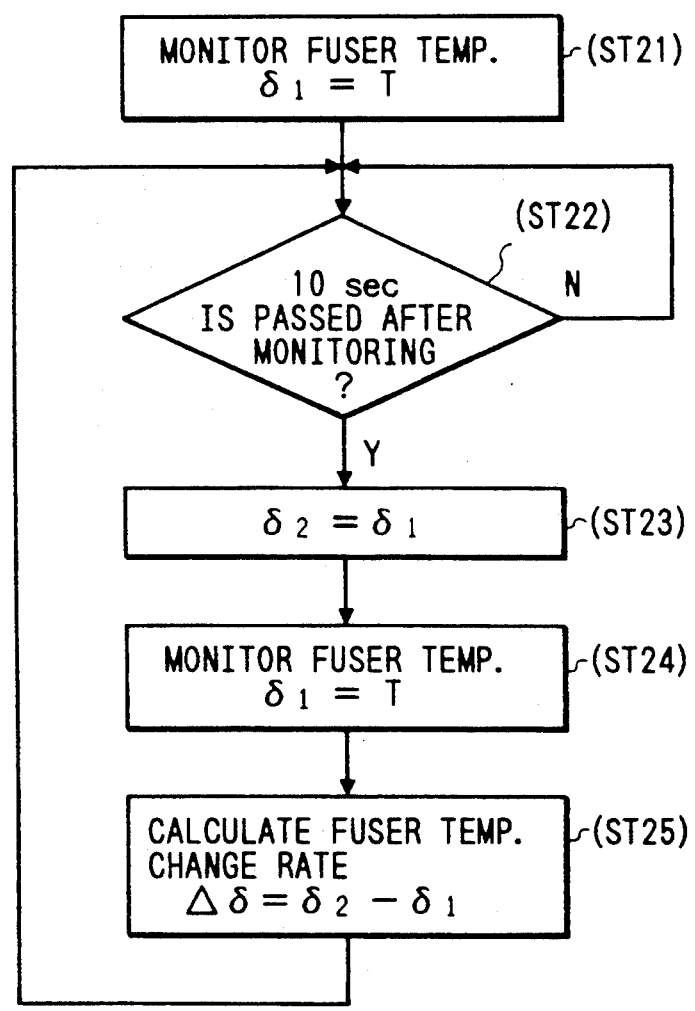
FIG. 16 is a flow chart showing a typical example of a temperature monitoring routine.

The details of the temperature monitoring routine are shown in FIGS. 16 and 17. An initial fuser temperature reading is obtained as $\delta_1$ (ST21). Following a predetermined waiting period, $\Delta t$, about 10 seconds in this embodiment, a second fuser temperature reading, $\delta_2$ replaces the initail value, $\delta_1$ and at the same time the fuser temperature T is monitored and a new reading obtained as $\delta_1$ (ST22 to ST24). The fuser temperature change rate $\Delta\delta = \delta_2 - \delta_1$ is calculated (ST25). Thereafter, steps ST22 to ST25 are successively repeated.

Returning to ST3 in FIG. 15, a determination is made as to whether the printing paper size is equal to or larger than B4 size (ST3). When the printing paper size is equal to or larger than B4 size, a determination is made as to whether the fuser temperature change rate $\Delta\delta$ is less than a predetermined value for printing paper having a size equal to or larger than B4 size, $K_L$ (ST4). When the size is equal to or larger than B4 size, a determination is made as to whether the fuser temperature change rate $\delta$ is less than a predetermined value for printing paper having a size smaller than the B4 size, $K_s$ (ST5).

In the case where it is confirmed in ST4 or ST5 that the fuser temperature change rate $\Delta\delta$ is less than the respective predetermined value, the fuser is estimated to be operating normally. In short, the printing job is interrupted to execute a fuser reheating cycle and the document reading operation and the image storing operation are continued (ST6). On the contrary, in the case where it is confirmed in ST4 or ST5 that the fuser temperature change rate $\Delta\delta$ is greater than or equal to the respective predetermined value, all the operations are interrupted under the assumption that the fuser has failed (ST7).

Thereafter, a determination is made as to whether the fuser temperature T is greater the target control temperature $T_0$ (ST8). When it is confirmed that the temperature T is greater than the target control temperature $T_0$, operations, which may include a printing operation in the case where both the document reading operation and the image storing operation have been already started, are restarted (ST9). However, if the fuser temperature T is not greater than the target control temperature $T_0$, a determination is made as to whether the reheating cycle has taken longer than a predetermined time period Q (ST10). If the lapsed time is greater than time Q, a failure recovery process is performed (ST11).

According to the aforementioned job control sequence at the time of printing, the same operation and effects as in the first Embodiment can be attained.

The third embodiment of the present invention provides a means for securely performing a fuser reheating cycle between jobs without interruption of any one particular printing job.

Figure 18:
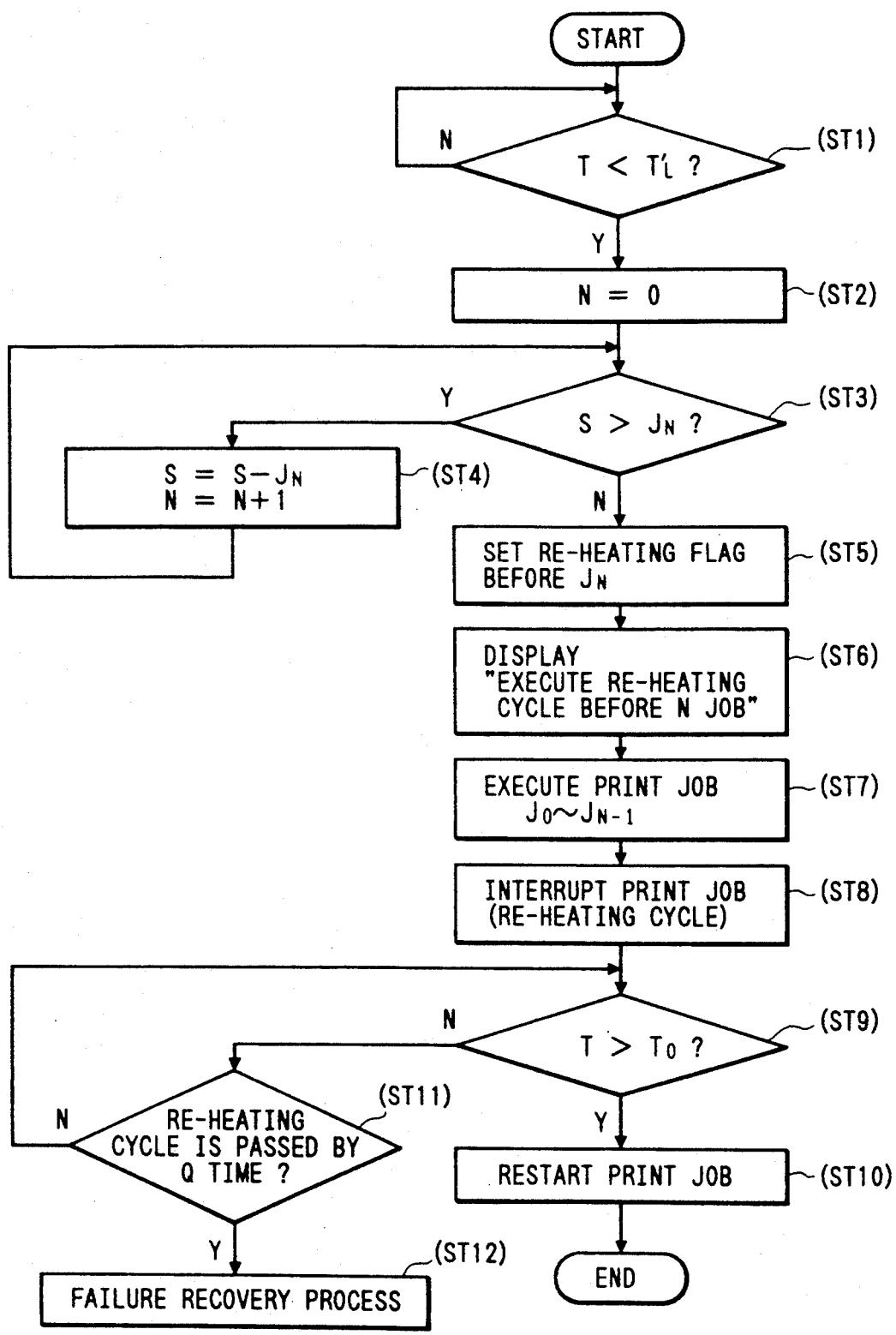
FIG. 18 is a flow chart showing the job control sequence at the time of printing of a digital electrophotographic copying apparatus according to a third embodiment of the present invention.
Figure 19:
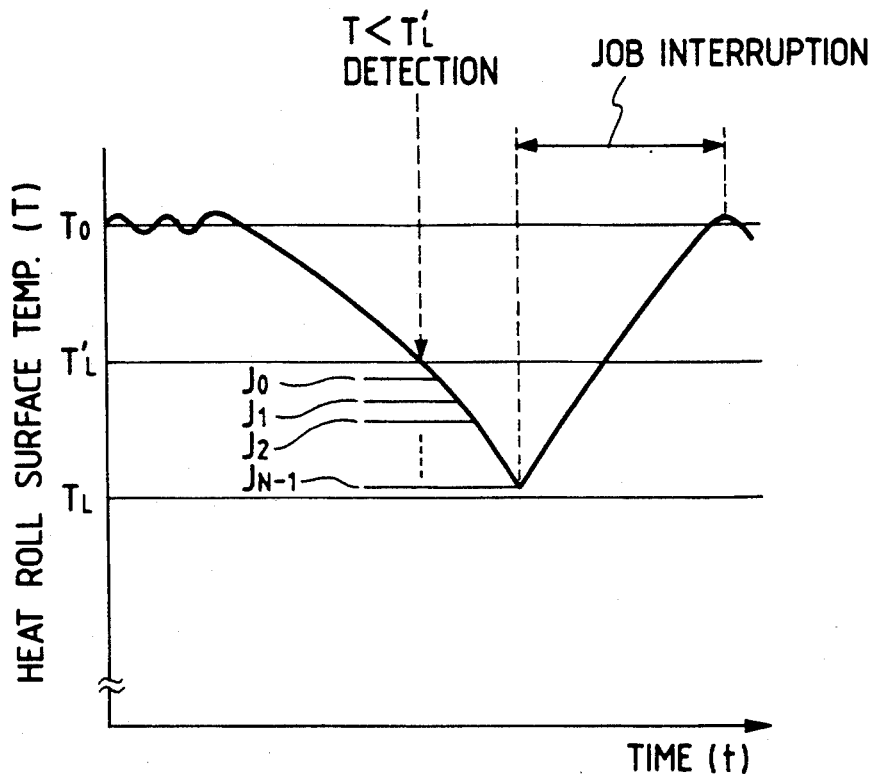
FIG. 19 is graph illustrating an operation according to the job control sequence shown in FIG. 18.

The job control sequence at the time of printing for the third embodiment is shown in FIG. 18. The CPU 101 first determines whether the fuser temperature T is less than a before-fusing-failure temperature, $T_L'$, see FIG. 19, which is greater than the fusing failure temperature $T_L$ (ST1). When it is determined that the fuser temperature T is less than the before-fusing-failure temperature $T_L'$, initialization of N=0 is made (ST2) and a determination is made as to whether the relation $S > J_N$ is satisfied (ST3).

In the ST3, S represents the total quantity of jobs estimated to be processed in the period between the before-fusing-failure temperature $T_L'$ and the fusing failure temperature $T_L$, and $J_N$ represents an N-th job which is, for example, expressed by the equation:

$$J_N = k_0 m(A4) + k_1 m(B4) + \ldots$$

where m(A4) represents the number of A4-size sheets, m(B4) represents the number of B4-size sheets, and $k_0$ and $k_1$ represent correction coefficients for each respective paper size and are used for the purpose of calculating information concerning the number of copies as a standard paper size.

When the condition $S > J_N$ is satisfied in ST3, replacement of S=S−Jhd N and N=N+1 is made (ST4) and then step ST3 is repeated. When the condition $S > J_N$ is not satisfied, a flag indicating execution of a reheating cycle is set in the front of data representing $J_N$ (ST5). A message "Reheating cycle will be started before the job N" is displayed (ST6). After printing jobs $J_0$ to $J_{N-1}$, where $J_0$ is the residual quantity of the current printing job, (ST7), the printing job is interrupted to execute the reheating cycle of the fuser (ST8).

Figure 20:
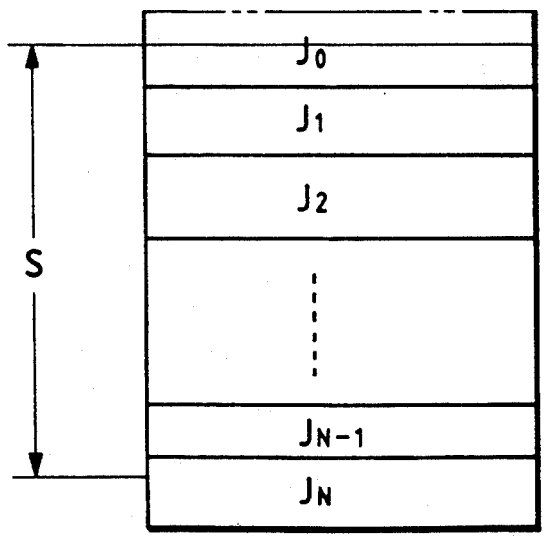
FIG. 20 is an illustration explaining the theory in the case where a job (or jobs) to be processed before the cycle of reheating the fuser is determined.

In the sequence of FIG. 18, jobs ($J_0, J_1 \ldots J_{N-1}$) are processed in the period during which fuser temperature T is predicted to fall from the before-fusing-failure temperature $T_L'$ to the fusing failure temperature $T_L$. See FIGS. 19 and 20. Subsequent printing jobs are executed following execution of a fuser reheating cycle.

Thereafter, a determination is made as to whether the fuser temperature T is greater than the target control temperature $T_0$ (ST9). When the fuser temperature T is greater than the target control temperature $T_0$, the printing job is restarted (ST10). If the fuser temperature T is not greater than the target control temperature $T_0$, a determination is made as to whether the reheating cycle has taken longer than a predetermined time period Q (ST11). If the elapsed time is greater than the predetermined time Q, a failure recovery process is performed (ST12).

According to the aforementioned job control sequence at the time of printing, complete jobs can be processed after the occurrence of a fuser reheating cycle has been predicted. Accordingly an operator is made aware as to which jobs will not be completed before the fuser reheating cycle is performed and a particularly urgent job can be removed and performed on another copying apparatus.

As described above in the several embodiments of the present invention, the document reading operation and the image storing operation are started prior to completion of the printing means start-up process, at the point in time where the start-up processes for the document reading means and the image storage means are completed. Documents can thus be read and the resulting image data stored in advance of the printing means completing its start-up process. Accordingly, total job processing time can be reduced and job-processing efficiency can be improved.

According to the second embodiment of the present invention, the start-up state of a sub-unit of the printing means is determined and the document reading operation and the image storing operation are accordingly started prior to completion of the start-up process required by the printing means under the condition that the sub-unit is predicted to begin operation within a range of predetermined operating norms. Accordingly, an unnecessary document reading operation and image data storing operation are avoided.

According to the third embodiment of the present invention a determination as to whether or not the sub-unit will start within a range of predetermined operating norms can easily be made by checking the rate of fuser temperature change to determine whether or not the fuser (sub-unit) has broken down.

According to the forth embodiment of the present invention, the document reading operation and the image storing operation are continued even though the image printing operation is interrupted at the time of printing to execute a fuser reheating cycle. Furthermore, the document may be read and the resulting image data stored before the start-up process for the image printing means is completed. Therefore, the total job-processing time can be reduced and job-processing efficiency can be improved.

More particularly, the document reading operation and the image storing operation are continued only under the condition that the fuser is predicted to resume operation within the range of predetermined operating norms following a reheating cycle. The determination as to whether or not the fuser will resume normal operation can be easily made by monitoring the rate of fuser temperature change (temperature rising rate or temperature falling rate).

According to the fifth embodiment of the present invention, the reheating cycle of the fuser is carried out between printing jobs based on a calculation of the quantity of stored jobs. Accordingly, the interruption of a printing job during a fuser reheating cycle can be avoided. Consequently, the situation that a particular job must be kept waiting during the time required to complete the fuser reheating cycle can be avoided. In addition, the operator will receive notice as to which jobs will not be completed before the fuser reheating cycle begins and may remove a particularly urgent job and perform the job on another copying apparatus.

The foregoing description of preferred embodiments of the invention has been presented for the purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and it practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A digital electrophotographic copying apparatus, comprising:
    document reading means having a start-up process for reading documents and producing corresponding image data;
    image storage means having a start-up process for temporarily storing the image data obtained from said document reading means;
    image printing means having a start-up process for printing documents copies according to an electrophotographic process based on the image data stored in said image storage means;
    job control means for starting document reading by said document reading means and image data storing by said image storage means upon switching electrical power to the digital electrophotographic copying apparatus and upon an indication of completion of the document reading means start-up process and the image storage means start-up process and before receiving an indication of completion for the image printing means start-up process.

2. A digital electrophotographic copying apparatus, comprising:
    document reading means for reading documents and producing corresponding image data;
    image storage means for temporarily storing the image data obtained from said document reading means;
    image printing means having a sub-unit for printing document copies according to an electrophotographic process based on the image data stored in said image storage means;
    starting state monitoring means for monitoring a starting state of the sub-unit upon switching electrical power to the digital electrophotographic copying apparatus and for generating corresponding starting state information;
    starting state determination means for predictively determining, based on information obtained from said starting state monitoring means, whether or not the sub-unit will start operation within a range of predetermined operating norms; and,
    job control means for starting document reading by said document reading means and image data storing by said image storage means in response to a predictive determination by said starting state determination means that the sub-unit will start within the range of predetermined operating norms.

3. A digital electrophotographic copying apparatus according to claim 2, wherein said sub-unit is a fuser and said starting state monitoring means is disposed to monitor a temperature change of the fuser, and wherein said starting state determination means is disposed to predictively determine, on the basis of a temperature rising rate of the fuser, whether or not the fuser will start within the range of predetermined operating norms.

4. A digital electrophotographic copying apparatus, comprising:
    document reading means for reading documents and producing corresponding image data;
    image storage means for temporarily storing the image data obtained from said document reading means;
    image printing means having a sub-unit for printing document copies according to an electrophotographic process based on the image data stored in said image storage means;
    temperature change monitoring means for monitoring a temperature of the fuser during the printing of document copies by said image printing means and for generating corresponding temperature information;
    fusing failure temperature determination means for determining, based on information obtained from said temperature change monitoring means, whether or not the temperature of the fuser falls below a predetermined fusing failure temperature during the printing of document copies by said image printing means; and,
    job control means for temporarily interrupting the printing of document copies by said image printing means, for executing a fuser reheating cycle during the interruption, and for continuing document reading by said document reading means and image data storing by said image storage means in response to a determination by said fusing failure temperature determination means that the temperature of the fuser has fallen below the fusing failure temperature.

5. A digital electrophotographic copying apparatus, comprising:
    document reading means for reading documents and producing corresponding image data;
    image storage means for temporarily storing the image data obtained from said document reading means;
    image printing means having a sub-unit for printing document copies according to an electrophotographic process based on the image data stored in said image storage means;
    temperature change monitoring means for monitoring a temperature of the fuser during the printing of copies by said image printing means and for generating corresponding temperature information;
    fusing failure temperature determination means for determining, based on information obtained from said temperature change monitoring means, whether or not the temperature of the fuser falls below a predetermined fusing failure temperature;
    temperature change rate determination means for determining, based on information obtained from said temperature change monitoring means, whether or not a rate of temperature change for the fuser is within a predetermined range of operating norms; and
    job control means, responsive to a determination by said fusing failure temperature determination means that the temperature of the fuser has fallen below the fusing failure temperature during printing of document copies by said image printing means, for temporarily interrupting the printing of document copies by said image printing means, for executing a fuser reheating cycle during the interruption, and for continuing document reading by said document reading means and image data storing by said image storage means provided that said temperature change rate determination means determines that the rate of temperature change for the fuser is within the range of predetermined operating norms.

6. A digital electrophotographic copying apparatus according to claim 5, wherein said temperature change rate determination means is disposed to determine whether or not the rate of temperature rising for the fuser is within the range of predetermined operating norms.

7. A digital electrophotographic copying apparatus according to claim 5, wherein said temperature change rate determination means is disposed to determine whether or not the rate of temperature falling for the fuser is within the range of predetermined operating norms.

8. A digital electrophotographic copying apparatus, comprising:

document reading means for reading documents and producing corresponding image data;

image storage means for temporarily storing the image data obtained from said document reading means;

image printing means having a sub-unit for printing document copies according to an electrophotographic process based on the image data stored in said image storage means;

temperature change monitoring means for monitoring a temperature of a fuser during the printing of document copies by said image printing means and generating corresponding temperature information;

before-fusing-failure temperature determination means for determining, based on information obtained from said temperature change monitoring means, whether or not the temperature of the fuser falls below a predetermined before-fusing-failure temperature which is near to a fusing failure temperature and for predictively calculating the time required for the temperature of the fuser to change from the before-fusing-failure temperature and the fusing failure temperature;

executable job quantity selection means, responsive to an determination by said before-fusing-failure temperature determination means that the fuser temperature has fallen below the predetermined before-fusing-failure temperature, for selecting a quantity of document to be printed by said image printing means during the time period calculated by said before-fusing-failure temperature determination means; and job control means for temporarily interrupting the printing of document copies by said image printing means after printing the quantity of documents selected by said executable job quantity selection means and for executing a fuser reheating cycle during the interruption.

* * * * *

UNITED STATES PATENT AND TRADEMARK OFFICE
CERTIFICATE OF CORRECTION

PATENT NO. : 5,046,166
DATED : September 03, 1991
INVENTOR(S) : Hiroshi TAKAYANAGI It is certified that error appears in the above-identified patent and that said Letters Patent is hereby corrected as shown below:

Claim 1, column 15, line 21, change "documents" to --document--.

Claim 8, column 18, line 17, before "determination" change "an" to --a--.

Signed and Sealed this

Eighth Day of June, 1993

Attest:

MICHAEL K. KIRK

Attesting Officer

Acting Commissioner of Patents and Trademarks